United States Patent
Chang et al.

(10) Patent No.: US 12,386,592 B2
(45) Date of Patent: Aug. 12, 2025

(54) MEMORY ARRAY STRUCTURE WITH DYNAMIC DIFFERENTIAL-REFERENCE BASED READOUT SCHEME FOR COMPUTING-IN-MEMORY APPLICATIONS, DYNAMIC DIFFERENTIAL-REFERENCE TIME-TO-DIGITAL CONVERTER FOR COMPUTING-IN-MEMORY APPLICATIONS AND COMPUTING METHOD THEREOF

(71) Applicant: NATIONAL TSING HUA UNIVERSITY, Hsinchu (TW)

(72) Inventors: Meng-Fan Chang, Hsinchu (TW); Ping-Chun Wu, Hsinchu (TW); Jin-Sheng Ren, Hsinchu (TW); Li-Yang Hong, Hsinchu (TW); Ho-Yu Chen, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 849 days.

(21) Appl. No.: 17/651,422

(22) Filed: Feb. 17, 2022

(65) Prior Publication Data
US 2023/0259331 A1 Aug. 17, 2023

(51) Int. Cl.
*G06F 7/544* (2006.01)
*G06F 15/78* (2006.01)
*G06G 7/16* (2006.01)

(52) U.S. Cl.
CPC ........ *G06F 7/5443* (2013.01); *G06F 15/7821* (2013.01); *G06G 7/16* (2013.01)

(58) Field of Classification Search
CPC .... G06F 7/5443; G06F 17/16; G06F 15/7821; G06G 17/16
See application file for complete search history.

(56) References Cited

U.S. PATENT DOCUMENTS

| | | | |
|---|---|---|---|
| 2019/0042160 A1* | 2/2019 | Kumar | G06F 3/0659 |
| 2021/0064367 A1* | 3/2021 | Kim | G04F 10/005 |
| 2021/0366542 A1* | 11/2021 | Lee | G11C 13/0061 |
| 2021/0405967 A1* | 12/2021 | Jung | G06N 3/065 |
| 2022/0004852 A1* | 1/2022 | Ju | G11C 11/54 |
| 2022/0027130 A1* | 1/2022 | Kashmiri | G06N 3/048 |
| 2023/0238047 A1* | 7/2023 | Chang | H03K 19/1737 |

* cited by examiner

*Primary Examiner* — Matthew D Sandifer
(74) *Attorney, Agent, or Firm* — CKC & Partners Co., LLC

(57) ABSTRACT

A dynamic differential-reference time-to-digital converter for computing-in-memory applications is controlled by a bias reference and a predetermined setting parameter, and includes a configurable main-reference selector and a plurality of time-to-digital converters. The configurable main-reference selector is configured to receive a plurality of edge-output signals, select one of the edge-output signals as a main reference and select others of the edge-output signals as a plurality of edge selected signals according to the predetermined setting parameter. One of the time-to-digital converters is configured to compare the bias reference with the main reference to output a bias multiplication-and-accumulation value, and others of the time-to-digital converters are configured to compare the main reference with the edge selected signals to output a plurality of differential multiplication-and-accumulation values. The bias multiplication-and-accumulation value and the differential multiplication-and-accumulation values are dynamically adjusted according to the bias reference and the predetermined setting parameter.

20 Claims, 14 Drawing Sheets

MEMORY ARRAY STRUCTURE WITH DYNAMIC DIFFERENTIAL-REFERENCE BASED READOUT SCHEME FOR COMPUTING-IN-MEMORY APPLICATIONS, DYNAMIC DIFFERENTIAL-REFERENCE TIME-TO-DIGITAL CONVERTER FOR COMPUTING-IN-MEMORY APPLICATIONS AND COMPUTING METHOD THEREOF

BACKGROUND

Technical Field

The present disclosure relates to a memory array structure with a dynamic differential-reference based readout scheme, a dynamic differential-reference time-to-digital converter and a computing method thereof. More particularly, the present disclosure relates to a memory array structure with a dynamic differential-reference based readout scheme for computing-in-memory applications, a dynamic differential-reference time-to-digital converter for computing-in-memory applications and a computing method thereof.

Description of Related Art

Computing-In-Memory (CIM) is a promising solution that can reduce the power consumption of AI chip multiplication and accumulation (MAC) operations. In order to increase the bandwidth and reduce the power consumption of each operation, CIM would turn on multiple word lines (WL) in a memory array to compute at the same time. The computing results will accumulate on bit lines (BL) and read out by an analog-to-digital converter (ADC) which is one of the current development directions. However, the signal margin of the MAC value is restricted by the magnitude of a power supply voltage VDD, thereby causing serious error when sensing the values. In addition, the readout circuits are the main source of power consumption when computing MAC operation. Reducing the effect of the power supply voltage VDD to signal margin and improving the performance of readout circuits are two of the challenges to achieve low power consumption and high accuracy in CIM. Accordingly, a memory array structure with a dynamic differential-reference based readout scheme for CIM applications, a dynamic differential-reference time-to-digital converter for CIM applications and a computing method thereof having the features of reducing the total power consumption, shortening the sampling periods and improving the overall circuit performance in readout operations are commercially desirable.

SUMMARY

According to one aspect of the present disclosure, a dynamic differential-reference time-to-digital converter for computing-in-memory applications is controlled by a bias reference and a predetermined setting parameter. The dynamic differential-reference time-to-digital converter for computing-in-memory applications includes a configurable main-reference selector and a plurality of time-to-digital converters. The configurable main-reference selector is configured to receive a plurality of edge-output signals. The configurable main-reference selector is configured to select one of the edge-output signals as a main reference and select others of the edge-output signals as a plurality of edge selected signals according to the predetermined setting parameter. The time-to-digital converters are connected to the configurable main-reference selector and configured to receive the bias reference, the main reference and the edge selected signals. One of the time-to-digital converters is configured to compare the bias reference with the main reference to output a bias multiplication-and-accumulation value, and others of the time-to-digital converters are configured to compare the main reference with the edge selected signals to output a plurality of differential multiplication-and-accumulation values. The bias multiplication-and-accumulation value and the differential multiplication-and-accumulation values are dynamically adjusted according to the bias reference and the predetermined setting parameter.

According to another aspect of the present disclosure, a memory array structure with a dynamic differential-reference based readout scheme for computing-in-memory applications is controlled by a bias reference and a predetermined setting parameter. The memory array structure with the dynamic differential-reference based readout scheme for computing-in-memory applications includes a delay computing block and a dynamic differential-reference time-to-digital converter. The delay computing block is configured to receive a plurality of multi-bit analog input voltages, a plurality of edge-input signals and a weight. The delay computing block is configured to generate a plurality of edge-output signals having a plurality of delay times according to the multi-bit analog input voltages, the edge-input signals and the weight. The dynamic differential-reference time-to-digital converter is connected to the delay computing block and includes a configurable main-reference selector and a plurality of time-to-digital converters. The configurable main-reference selector is configured to receive the edge-output signals. The configurable main-reference selector is configured to select one of the edge-output signals as a main reference and select others of the edge-output signals as a plurality of edge selected signals according to the predetermined setting parameter. The plurality of time-to-digital converters are connected to the configurable main-reference selector and configured to receive the bias reference, the main reference and the edge selected signals. One of the time-to-digital converters is configured to compare the bias reference with the main reference to output a bias multiplication-and-accumulation value, and others of the time-to-digital converters are configured to compare the main reference with the edge selected signals to output a plurality of differential multiplication-and-accumulation values. The bias multiplication-and-accumulation value and the differential multiplication-and-accumulation values are dynamically adjusted according to the bias reference and the predetermined setting parameter.

According to further another aspect of the present disclosure, a computing method of a dynamic differential-reference time-to-digital converter for computing-in-memory applications is controlled by a bias reference and a predetermined setting parameter. The computing method includes performing a voltage level applying step and a computing step. The voltage level applying step includes applying a plurality of voltage levels to the bias reference, the predetermined setting parameter and a plurality of edge-output signals, respectively. The computing step includes performing a selecting step and a converting step. The selecting step includes configuring a configurable main-reference selector to select one of the edge-output signals as a main reference and select others of the edge-output signals as a plurality of edge selected signals according to the predetermined setting parameter. The converting step includes configuring one of a plurality of time-to-digital converters to compare the bias reference with the main reference to output a bias multiplication-and-accumulation value, and configuring others of the time-to-digital converters to compare the main reference with the edge selected signals to output a plurality of differential multiplication-and-accumulation values. The bias multiplication-and-accumulation value and the differential multiplication-and-accumulation values are dynamically adjusted according to the bias reference and the predetermined setting parameter.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected to" another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
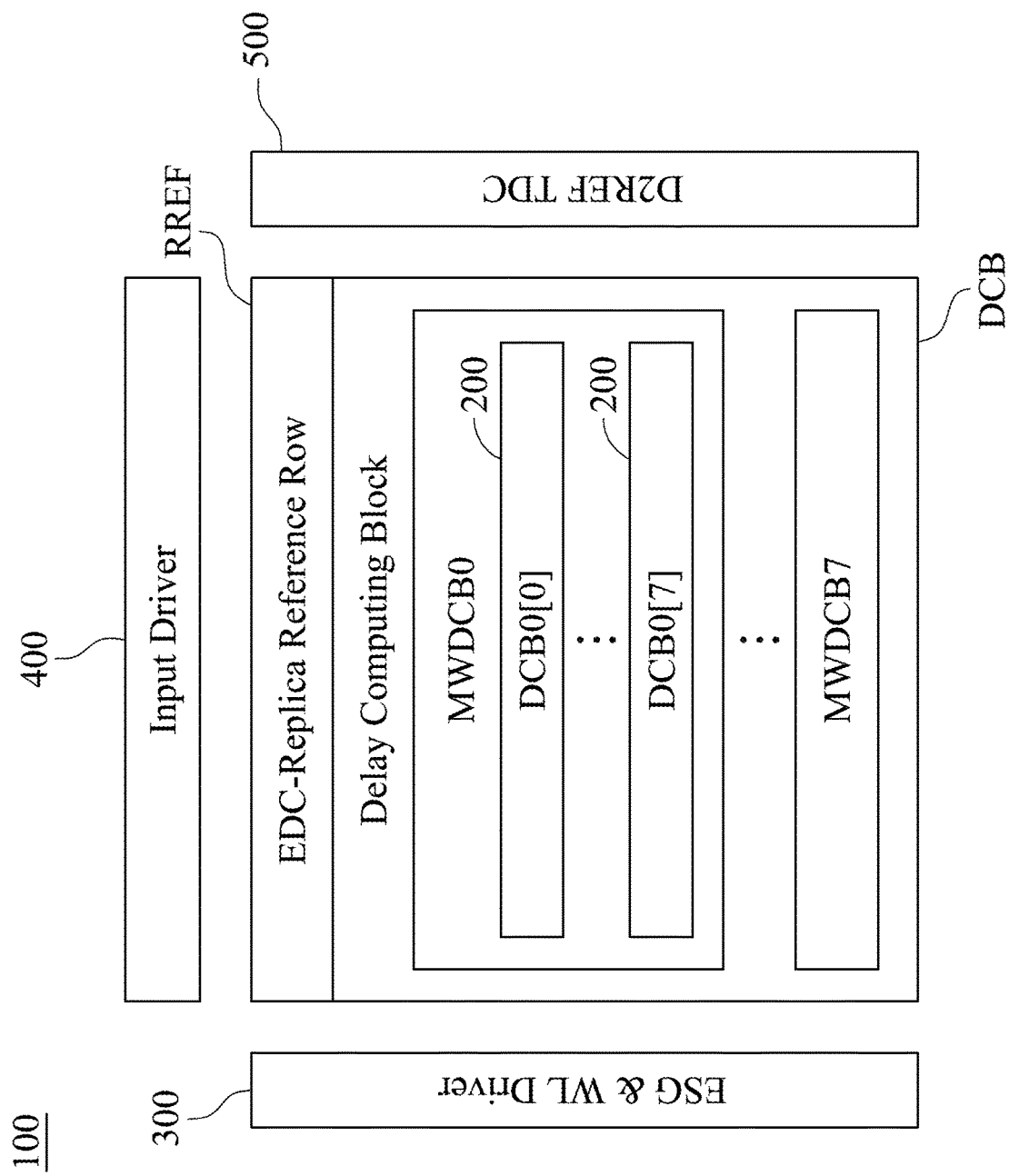
FIG. 1 shows a block diagram of a memory array structure with a dynamic differential-reference based readout scheme for computing-in-memory (CIM) applications according to a first embodiment of the present disclosure.
Figure 2:
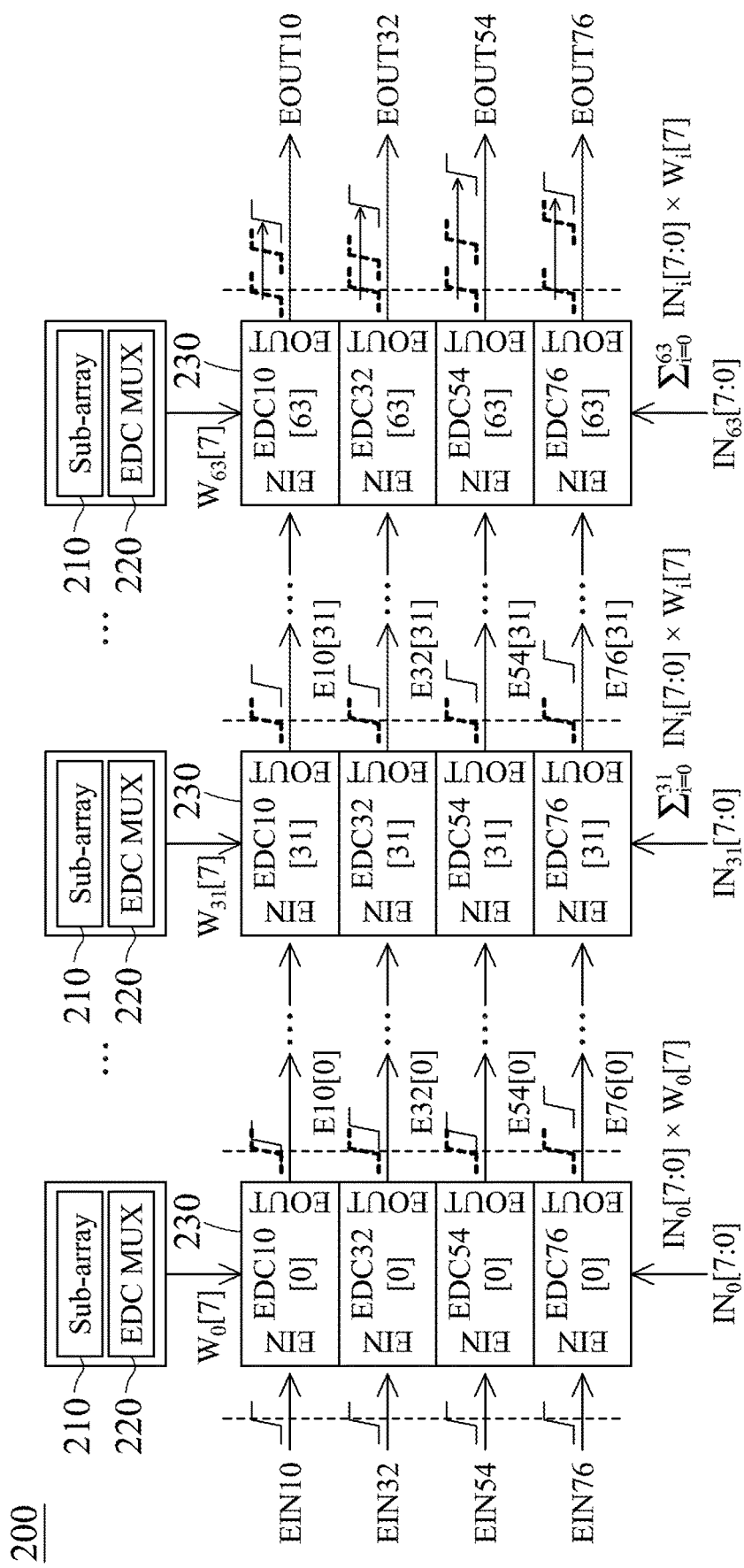
FIG. 2 shows a circuit diagram of one of a plurality of memory units with time domain edge delay accumulation for CIM applications of the memory array structure with the dynamic differential-reference based readout scheme for CIM applications of FIG. 1.
Figure 3:
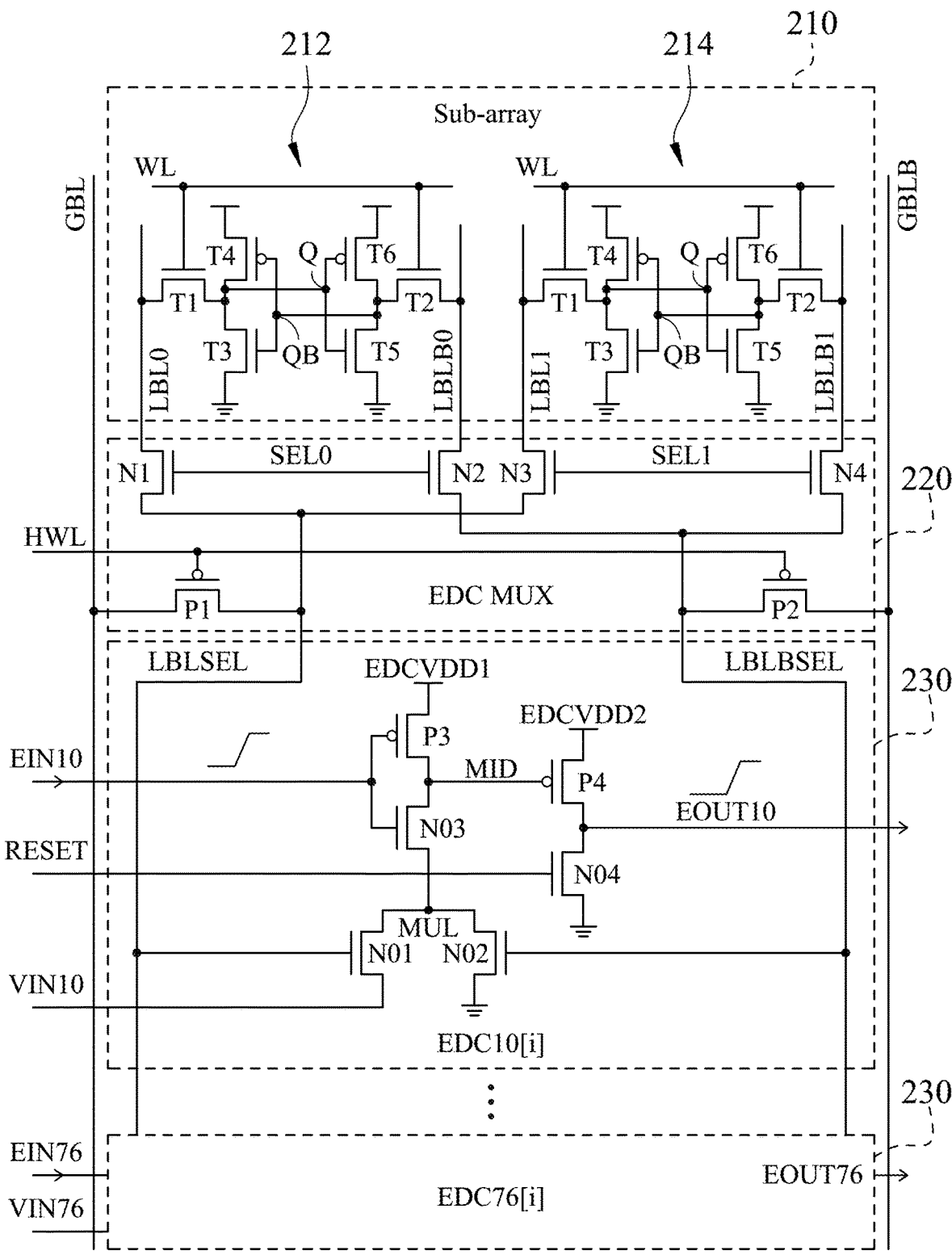
FIG. 3 shows a circuit diagram of a sub-array memory cell module, an edge-delay cell multiplexor and a plurality of edge-delay cells of the memory unit with time domain edge delay accumulation for CIM applications of FIG. 2.
Figure 4:
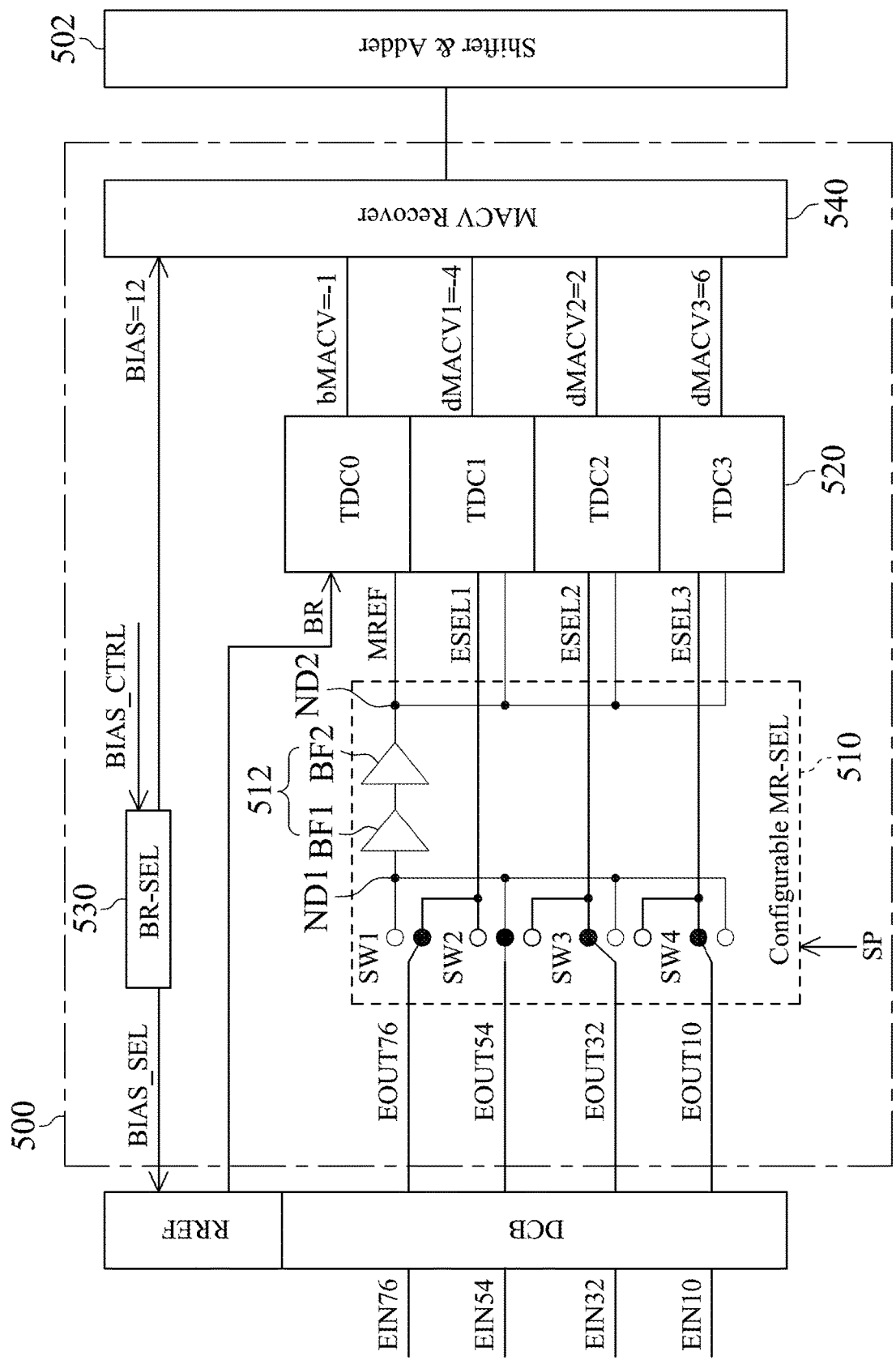
FIG. 4 shows a circuit diagram of a dynamic differential-reference time-to-digital converter for CIM applications of the memory array structure with the dynamic differential-reference based readout scheme for CIM applications of FIG. 1.
Figure 9:
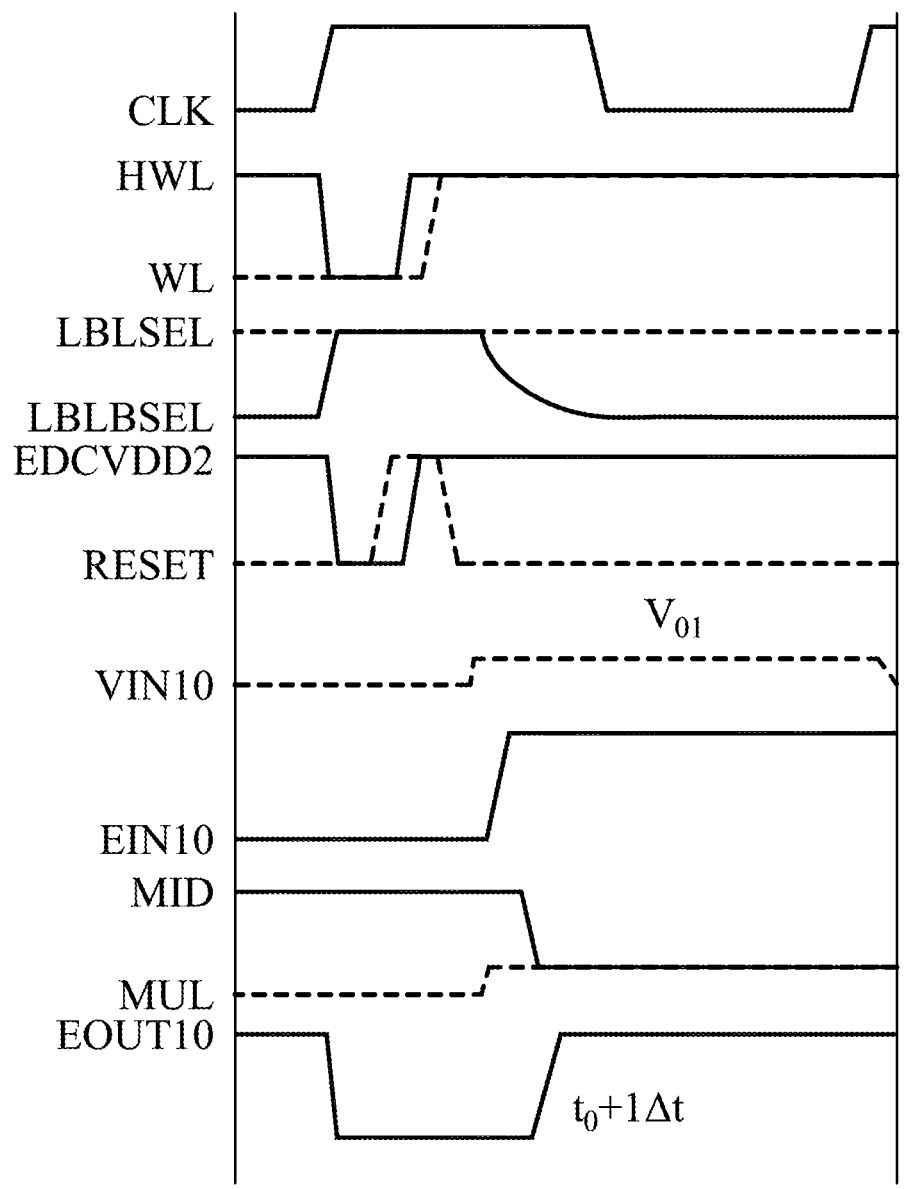
FIG. 9 shows a timing diagram associated with the sub-array memory cell module, the edge-delay cell multiplexor and the edge-delay cells of FIG. 3, when a multi-bit analog input voltage is equal to $V_{O1}$.
Figure 10:
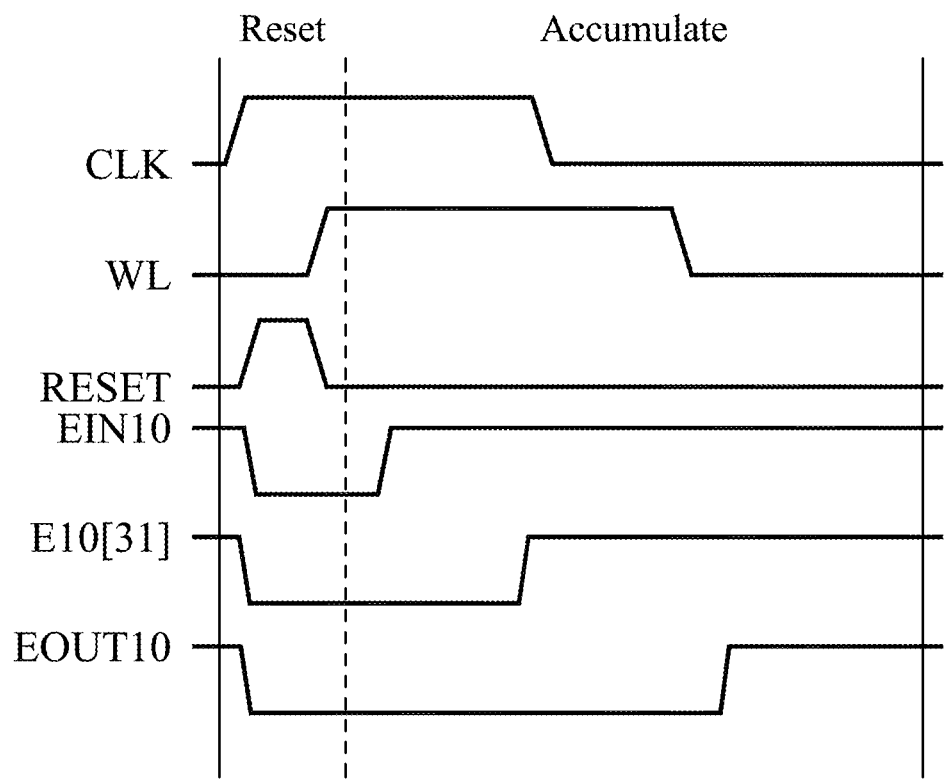
FIG. 10 shows a timing diagram associated with the one of the memory units with time domain edge delay accumulation for CIM applications of FIG. 2.

Please refer to FIGS. 1-4, 9 and 10. FIG. 1 shows a block diagram of a memory array structure 100 with a dynamic differential-reference based readout scheme for computing-in-memory (CIM) applications according to a first embodiment of the present disclosure. FIG. 2 shows a circuit diagram of one of a plurality of memory units 200 with time domain edge delay accumulation for CIM applications of the memory array structure 100 with the dynamic differential-reference based readout scheme for CIM applications of FIG. 1. FIG. 3 shows a circuit diagram of a sub-array memory cell module 210 (Sub-array), an edge-delay cell multiplexor 220 (EDC MUX) and a plurality of edge-delay cells 230 (EDC10[i], EDC76[i]) of the memory unit 200 with time domain edge delay accumulation for CIM applications of FIG. 2. FIG. 4 shows a circuit diagram of a dynamic differential-reference time-to-digital converter 500 for CIM applications of the memory array structure 100 with the dynamic differential-reference based readout scheme for CIM applications of FIG. 1. FIG. 9 shows a timing diagram associated with the sub-array memory cell module 210, the edge-delay cell multiplexor 220 and the edge-delay cells 230 of FIG. 3, when a multi-bit analog input voltage is equal to $V_{O1}$. FIG. 10 shows a timing diagram associated with the one of the memory units 200 with time domain edge delay accumulation for CIM applications of FIG. 2. In FIGS. 1-4, 9 and 10, the memory array structure 100 with the dynamic differential-reference based readout scheme for CIM applications is controlled by a bias reference BR and a predetermined setting parameter SP. The dynamic differential-reference based readout scheme is corresponding to the dynamic differential-reference time-to-digital converter 500. The memory array structure 100 with the dynamic differential-reference based readout scheme for CIM applications includes an EDC-replica reference row RREF, a delay computing block DCB, a word line driver unit 300, an input driver 400 and the dynamic differential-reference time-to-digital converter 500.

The EDC-replica reference row RREF is configured to generate the bias reference BR and connected to the delay computing block DCB. The EDC-replica reference row RREF is located on a top side of the delay computing block DCB. The delay computing block DCB includes a plurality of multi-bit weight delay computing blocks MWDCB0-MWDCB7. The structures of the multi-bit weight delay computing blocks MWDCB0-MWDCB7 are the same with each other. Each of the multi-bit weight delay computing blocks MWDCB0-MWDCB7 includes eight memory units 200 (e.g., DCB0[0]-DCB0[7]). The memory units 200 are connected to each other. Each of the memory units 200 is controlled by a first word line WL and a second word line HWL. Each of the memory units 200 includes at least one sub-array memory cell module 210, at least one edge-delay cell multiplexor 220 (EDC MUX), at least one edge-delay cell 230 (EDC), at least one global bit line GBL and at least one global bit line bar GBLB. In one embodiment, the number of the at least one sub-array memory cell module 210 and the number of the at least one edge-delay cell multiplexor 220 may be 64, and the number of the at least one edge-delay cell 230 may be 256, but the present disclosure is not limited thereto.

Each of the sub-array memory cell modules 210 includes a first-column memory cell 212 and a second-column memory cell 214. The first-column memory cell 212 stores a first weight and is controlled by the first word line WL. The second-column memory cell 214 stores a second weight and is controlled by the first word line WL. The structure of the first-column memory cell 212 is the same as the structure of the second-column memory cell 214.

The first-column memory cell 212 includes a first node Q, a second node QB, a first-column local bit line LBL0, a first-column local bit line bar LBLB0, a first memory cell transistor T1, a second memory cell transistor T2, a first inverter INV1 and a second inverter INV2. The first node Q stores the first weight. The second node QB stores a first inverted weight opposite to the first weight of the first node Q. The first-column local bit line LBL0 is connected to the edge-delay cell multiplexor 220 and transmits the first weight from the first-column memory cell 212 to the edge-delay cell multiplexor 220. The first-column local bit line bar LBLB0 is connected to the edge-delay cell multiplexor 220 and transmits the first inverted weight from the first-column memory cell 212 to the edge-delay cell multiplexor 220. The first memory cell transistor T1 is connected to the first node Q, the first-column local bit line LBL0 and the first word line WL. The second memory cell transistor T2 is connected to the second node QB, the first-column local bit line bar LBLB0 and the first word line WL. The first inverter INV1 is located between the first node Q and the second node QB. The first inverter INV1 includes a third memory cell transistor T3 and a fourth memory cell transistor T4 connected to the third memory cell transistor T3. The second inverter INV2 is connected to the first inverter INV1. The second inverter INV2 includes a fifth memory cell transistor T5 and a sixth memory cell transistor T6 connected to the fifth memory cell transistor T5.

The second-column memory cell 214 includes a first node Q, a second node QB, a second-column local bit line LBL1, a second-column local bit line bar LBLB1, a first memory cell transistor T1, a second memory cell transistor T2, a first inverter INV1 and a second inverter INV2. The first node Q stores the second weight. The second node QB stores a second inverted weight opposite to the second weight of the first node Q. The second-column local bit line LBL1 is connected to the edge-delay cell multiplexor 220 and transmits the second weight from the second-column memory cell 214 to the edge-delay cell multiplexor 220. The second-column local bit line bar LBLB1 is connected to the edge-delay cell multiplexor 220 and transmits the second inverted weight from the second-column memory cell 214 to the edge-delay cell multiplexor 220. The first memory cell transistor T1 is connected to the first node Q, the second-column local bit line LBL1 and the first word line WL. The second memory cell transistor T2 is connected to the second node QB, the second-column local bit line bar LBLB1 and the first word line WL. The first inverter INV1 and the second inverter INV2 of the second-column memory cell 214 are the same as the first inverter INV1 and the second inverter INV2 of the first-column memory cell 212. In other words, each of the first-column memory cell 212 and the second-column memory cell 214 is a 6T static random access memory (SRAM) cell. Each of the first memory cell transistor T1, the second memory cell transistor T2, the third memory cell transistor T3 and the fifth memory cell transistor T5 is the NMOS transistor. Each of the fourth memory cell transistor T4 and the sixth memory cell transistor T6 is the PMOS transistor.

The edge-delay cell multiplexor 220 is connected to the sub-array memory cell module 210 and controlled by the second word line HWL. The edge-delay cell multiplexor 220 is configured to generate one of the first weight and the second weight. In detail, the edge-delay cell multiplexor 220 includes a selected local bit line LBLSEL, a selected local bit line bar LBLBSEL, a first edge-delay cell multiplex transistor P1, a second edge-delay cell multiplex transistor P2, a third edge-delay cell multiplex transistor N1, a fourth edge-delay cell multiplex transistor N2, a fifth edge-delay cell multiplex transistor N3 and a sixth edge-delay cell multiplex transistor N4. The selected local bit line LBLSEL is connected to the edge-delay cells 230 (e.g., EDC10[i], EDC32[i], EDC54[i], EDC76[i], where i=0-63). The selected local bit line bar LBLBSEL is connected to the edge-delay cells 230. The first edge-delay cell multiplex transistor P1 is configured to connect the global bit line GBL to the selected local bit line LBLSEL for read and write operations according to the second word line HWL. The second edge-delay cell multiplex transistor P2 is configured to connect the global bit line bar GBLB to the selected local bit line bar LBLBSEL for the read and write operations according to the second word line HWL. The third edge-delay cell multiplex transistor N1 is connected between the first-column local bit line LBL0 and the selected local bit line LBLSEL. The fourth edge-delay cell multiplex transistor N2 is connected between the first-column local bit line bar LBLB0 and the selected local bit line bar LBLBSEL. The fifth edge-delay cell multiplex transistor N3 is connected between the second-column local bit line LBL1 and the selected local bit line LBLSEL. The sixth edge-delay cell multiplex transistor N4 is connected between the second-column local bit line bar LBLB1 and the selected local bit line bar LBLBSEL. The third edge-delay cell multiplex transistor N1 and the fourth edge-delay cell multiplex transistor N2 are controlled by a first selecting signal SEL0. The fifth edge-delay cell multiplex transistor N3 and the sixth edge-delay cell multiplex transistor N4 are controlled by a second selecting signal SEL1, and the first selecting signal SEL0 is opposite to the second selecting signal SEL1. The first selecting signal SEL0 and the second selecting signal SEL1 are generated by the word line driver unit 300.

The edge-delay cell 230 (one of EDC10[i], EDC32[i], EDC54[i], EDC76[i]) is connected to the edge-delay cell multiplexor 220 and configured to receive a multi-bit analog input voltage (one of VIN10, VIN32, VIN54, VIN76), an edge-input signal (one of EIN10, EIN32, EIN54, EIN76) and the one of the first weight and the second weight. The edge-delay cell 230 is configured to generate an edge-output signal (one of EOUT10, EOUT32, EOUT54, EOUT76) having a delay time (N×Δt, where N=0-3) according to the multi-bit analog input voltage, the edge-input signal and the one of the first weight and the second weight. The delay time (N×Δt) of the edge-output signal (one of EOUT10, EOUT32, EOUT54, EOUT76) is positively correlated with the multi-bit analog input voltage (one of VIN10, VIN32, VIN54, VIN76) multiplied by the one of the first weight and the second weight.

The edge-delay cell 230 (e.g., EDC10[i] in FIG. 3) includes a weight reader 232 and a driver 234. The weight reader 232 is configured to receive the one of the first weight and the second weight and the multi-bit analog input voltage VIN10 and generate a multi-bit voltage MUL according to the one of the first weight and the second weight and the multi-bit analog input voltage VIN10. The driver 234 is connected to the weight reader 232 and configured to receive an edge-input signal EIN10. The driver 234 is configured to generate an edge-output signal EOUT10 having a delay time (N×Δt) according to the edge-input signal EIN10 and the multi-bit voltage MUL. In detail, the weight reader 232 includes a first weight reader transistor N01 and a second weight reader transistor N02. The first weight reader transistor N01 is connected to the multi-bit voltage MUL, the selected local bit line LBLSEL of the edge-delay cell multiplexor 220 and the multi-bit analog input voltage VIN10. The second weight reader transistor N02 is connected to the multi-bit voltage MUL, the selected local bit line bar LBLBSEL of the edge-delay cell multiplexor 220 and the ground voltage VSS. In addition, the driver 234 includes a first driver transistor P3, a second driver transistor N03, a third driver transistor P4, a fourth driver transistor N04. The first driver transistor P3 is connected to a first power supply voltage EDCVDD1, the edge-input signal EIN10 and an internal delay voltage MID. The second driver transistor N03 is connected to the internal delay voltage MID, the edge-input signal EIN10 and the multi-bit voltage MUL. The third driver transistor P4 is connected to a second power supply voltage EDCVDD2, the internal delay voltage MID and the edge-output signal EOUT10. The fourth driver transistor N04 is connected to the edge-output signal EOUT10, a reset signal RESET and the ground voltage VSS. The first power supply voltage EDCVDD1 may be equal to the power supply voltage VDD. The second power supply voltage EDCVDD2 may be turned off for a period of time, thus saving power consumption, as shown in FIG. 4.

The global bit line GBL is connected to the edge-delay cell multiplexor 220. The global bit line bar GBLB is connected to the edge-delay cell multiplexor 220. The global bit line GBL and the global bit line bar GBLB is perpendicular to the first word line WL and the second word line HWL. Table 1 lists the weights (Weight), the multi-bit input values (IN[1:0]), the multi-bit analog input voltages (VIN10), the multi-bit output values (Value) and the delay times (Delay) of the edge-output signals EOUT10 of the edge-delay cell 230 of FIG. 3. The multi-bit output values (Value) can be computed by the multi-bit input values (IN[1:0]) and the weights (Weight). The weights (Weight) are corresponding to the voltage levels of the selected local bit line (LBLSEL). The multi-bit input values (IN[1:0]) are corresponding to the multi-bit analog input voltages (VIN10). The multi-bit output values (Value) are corresponding to the delay times (Delay) of the edge-output signals EOUT10. Each of the multi-bit analog input voltages (VIN10) may have fourth voltage levels which are equal to $V_{11}$ (e.g., 1.0 V), $V_{10}$ (e.g., 0.7 V), $V_{01}$ (e.g., 0.5 V) and VSS (0 V), respectively.

TABLE 1

| Weight | Input | | Input × Weight | |
| --- | --- | --- | --- | --- |
| LBLSEL | IN[1:0] | VIN10 | Value | Delay |
| 1 | 11 | $V_{11}$ | 3 | $t_0 + 3\Delta t$ |
|  | 10 | $V_{10}$ | 2 | $t_0 + 2\Delta t$ |
|  | 01 | $V_{01}$ | 1 | $t_0 + 1\Delta t$ |
|  | 00 | VSS | 0 | $t_0$ |
| 0 |  | Don't care | 0 | $t_0$ |

In FIG. 3, the number of the at least one edge-delay cell 230 is plural (e.g., EDC10[i], EDC32[i], EDC54[i], EDC76[i]). Each of the edge-delay cells 230 is connected to the edge-delay cell multiplexor 220 via the selected local bit line LBLSEL and the selected local bit line bar LBLBSEL. The edge-delay cells 230 are configured to receive the multi-bit analog input voltages VIN10, VIN32, VIN54, VIN76, the edge-input signals EIN10, EIN32, EIN54, EIN76 and the one of the first weight and the second weight. The edge-delay cells 230 are configured to generate the edge-output signals EOUT10, EOUT32, EOUT54, EOUT76 having a plurality of the delay times (N×Δt) according to the multi-bit analog input voltages VIN10, VIN32, VIN54, VIN76, the edge-input signals EIN10, EIN32, EIN54, EIN76 and the one of the first weight and the second weight.

In FIG. 2, the number of at least one sub-array memory cell module 210 is plural (e.g., 64). The number of the at least one edge-delay cell multiplexor 220 is plural (e.g., 64). The number of the at least one edge-delay cell 230 is plural (e.g., EDC10[0]-EDC10[63], that is EDC10[i], where i=0-63). The edge-delay cell multiplexors 220 are connected to the edge-delay cells 230 (e.g., EDC10[0]-EDC10[63]), respectively. The edge-delay cell multiplexors 220 are configured to transmit a plurality of weights $W_0[7]$-$W_{63}[7]$ (i.e., $W_i[7]$, where i=0-63) to each of the edge-delay cells 230 (e.g., EDC10[0]-EDC10[63]). One of the weights $W_0[7]$-$W_{63}[7]$ is the one of the first weight and the second weight. The edge-delay cells 230 (e.g., EDC10[0]-EDC10[63]) are configured to receive the multi-bit analog input voltages (e.g., $IN_i[1:0]$, where i=0-63), the edge-input signals (e.g., EIN10, E10[0]-E10[62]) and the weights $W_0[7]$-$W_{63}[7]$. The edge-delay cells 230 (e.g., EDC10[0]-EDC10[63]) are connected in series and configured to generate the edge-output signals (e.g., E10[0]-E10[62], EOUT10) having the delay times (N×Δt, where N=0-3), and the delay time of a last one (EOUT10) of the edge-output signals (e.g., E10[0]-E10[62], EOUT10) is positively correlated with a sum ($\Sigma_{i=0}^{63} IN_i[1:0] \times W_i[7]$) of the multi-bit analog input voltages (e.g., $IN_i[1:0]$, where i=0-63) multiplied by the weights $W_0[7]$-$W_{63}[7]$.

Therefore, the memory unit 200 with time domain edge delay accumulation for CIM applications of the present disclosure utilizes an unlimited characteristic of edge delay accumulation to improve the problem of restricted signal margin. Moreover, the edge-delay cell 230 has a simple circuit structure to save power consumption and improve the performance of CIM, and the sub-array memory cell module 210 including two memory cells (i.e., the first-column memory cell 212 and the second-column memory cell 214) can effectively save chip area, thus reducing manufacturing cost.

The word line driver unit 300 is connected to each of the memory units 200 via the first word line WL and the second word line HWL. The word line driver unit 300 is represented by "ESG & WL Driver" and is located on a left side of the memory units 200. "ESG" represents an edge-signal generator, i.e., the word line driver unit 300 includes the edge-signal generator and a word line driver. The edge-signal generator generates the edge-input signals EIN10, EIN32, EIN54, EIN76. The word line driver generates the voltage level of the first word line WL and the voltage level of the second word line HWL. The voltage level of the first word line WL, the voltage level of the second word line HWL and the edge-input signals EIN10, EIN32, EIN54, EIN76 are transmitted to each of the memory units 200 for computing. In other words, the edge-signal generator generates a rising-edge signal (e.g., the edge-input signal EIN10) at an input terminal EIN of the $1^{st}$ edge-delay cell 230 (e.g., EDC10[0]) of each of the memory units 200 and then output another rising-edge signal (e.g., the edge-output signal E10[0]) at an output terminal EOUT after a cell delay TEDC. The cell delay TEDC depends on the product of 2bIN×1bW (i.e., $IN_0[1:0] \times W_0[7]$). The next edge-delay cell 230 is triggered only after the previous edge-delay cell 230 has generated the rising-edge signal at its output terminal EOUT, which travels through all sixty-four edge-delay cells 230 in the memory unit 200. The delay time of the rising-edge signals between the input terminal EIN of the $1^{st}$ edge-delay cell 230 and the output terminal EOUT of the $64^{th}$ edge-delay cell 230 (e.g., EDC10[63]) is equal to $\Sigma_{i=0}^{63} IN_i[1:0] \times W_i[7]$, which represents a plurality of partial multiplication-and-accumulation values (pMACV) of 64-channel accumulations of 2bIN×1bW.

The input driver 400 is connected to each of the memory units 200 via the global bit line GBL and the global bit line bar GBLB. The input driver 400 is located on a top side of the EDC-replica reference row RREF. The input driver 400 generates the voltage level of the global bit line GBL and the voltage level of the global bit line bar GBLB according to the multi-bit input values (IN[1:0]).

The dynamic differential-reference time-to-digital converter 500 is connected to the delay computing block DCB and represented by "D2REF TDC" and is located on a right side of the memory units 200. The dynamic differential-reference time-to-digital converter 500 includes a configurable main-reference selector 510 (Configurable MR-SEL) and a plurality of time-to-digital converters 520 (TDC0, TDC1, TDC2, TDC3). The configurable main-reference selector 510 is configured to receive the edge-output signals EOUT10, EOUT32, EOUT54, EOUT76. The configurable main-reference selector 510 is configured to select one of the edge-output signals EOUT10, EOUT32, EOUT54, EOUT76 as a main reference MREF and select others of the edge-output signals EOUT10, EOUT32, EOUT54, EOUT76 as a plurality of edge selected signals ESEL1, ESEL2, ESEL3 according to the predetermined setting parameter SP. In addition, the time-to-digital converters 520 (TDC0, TDC1, TDC2, TDC3) are connected to the configurable main-reference selector 510 and configured to receive the bias reference BR, the main reference MREF and the edge selected signals ESEL1, ESEL2, ESEL3. One (TDC0) of the time-to-digital converters 520 is configured to compare the bias reference BR with the main reference MREF to output a bias multiplication-and-accumulation value bMACV, and others (TDC1, TDC2, TDC3) of the time-to-digital converters 520 are configured to compare the main reference MREF with the edge selected signals ESEL1, ESEL2, ESEL3 to output a plurality of differential multiplication-and-accumulation values dMACV1, dMACV2, dMACV3. The bias multiplication-and-accumulation value bMACV and the differential multiplication-and-accumulation values dMACV1, dMACV2, dMACV3 are dynamically adjusted according to the bias reference BR and the predetermined setting parameter SP. Accordingly, the dynamic differential-reference time-to-digital converter 500 for CIM applications of the present disclosure utilizes the dynamic differential-reference based readout scheme to adapt suitable reference signal (e.g., the bias reference BR and the main reference MREF) according to different implementations, thereby reducing the total power consumption, shortening the sampling periods and improving the overall circuit performance in readout operations.

In FIG. 4, the configurable main-reference selector 510 includes a first node ND1, a second node ND2, a buffer module 512, a first switch SW1, a second switch SW2, a third switch SW3 and a fourth switch SW4. The first node ND1 is electrically connected to the one (EOUT54) of the edge-output signals EOUT10, EOUT32, EOUT54, EOUT76. The second node ND2 is electrically connected to the time-to-digital converters 520 (TDC0, TDC1, TDC2, TDC3) and corresponding to the main reference MREF. The buffer module 512 is electrically connected between the first node ND1 and the second node ND2. The buffer module 512 includes a first buffer BF1 and a second buffer BF2. The first buffer BF1 is electrically connected between the first node ND1 and the second buffer BF2. The second buffer BF2 is electrically connected between the first buffer BF1 and the second node ND2. The edge-output signals EOUT10, EOUT32, EOUT54, EOUT76 include a first edge-output signal EOUT76, a second edge-output signal EOUT54, a third edge-output signal EOUT32 and a fourth edge-output signal EOUT10. The others of the time-to-digital converters 520 include a first time-to-digital converter TDC1, a second time-to-digital converter TDC2 and a third time-to-digital converter TDC3. The first switch SW1 is electrically connected to the first edge-output signal EOUT76 and one of the first node ND1 and the first time-to-digital converter TDC1 according to the predetermined setting parameter SP. The second switch SW2 is electrically connected to the second edge-output signal EOUT54 and one of the first time-to-digital converter TDC1, the first node ND1 and the second time-to-digital converter TDC2 according to the predetermined setting parameter SP. The third switch SW3 is electrically connected to the third edge-output signal EOUT32 and one of the second time-to-digital converter TDC2, the first node ND1 and the third time-to-digital converter TDC3 according to the predetermined setting parameter SP. The fourth switch SW4 is electrically connected to the fourth edge-output signal EOUT10 and one of the third time-to-digital converter TDC3 and the first node ND1 according to the predetermined setting parameter SP. In other words, the first switch SW1, the second switch SW2, the third switch SW3 and the fourth switch SW4 are switched according to the predetermined setting parameter SP.

In the configurable main-reference selector 510, in response to determining that the second edge-output signal EOUT54 is electrically connected to the first node ND1 via the second switch SW2, the second edge-output signal EOUT54 is corresponding to the main reference MREF, and the first edge-output signal EOUT76 is transmitted to the first time-to-digital converter TDC1 via the first switch SW1. The third edge-output signal EOUT32 is transmitted to the second time-to-digital converter TDC2 via the third switch SW3, and the fourth edge-output signal EOUT10 is transmitted to the third time-to-digital converter TDC3 via the fourth switch SW4.

Figure 5:
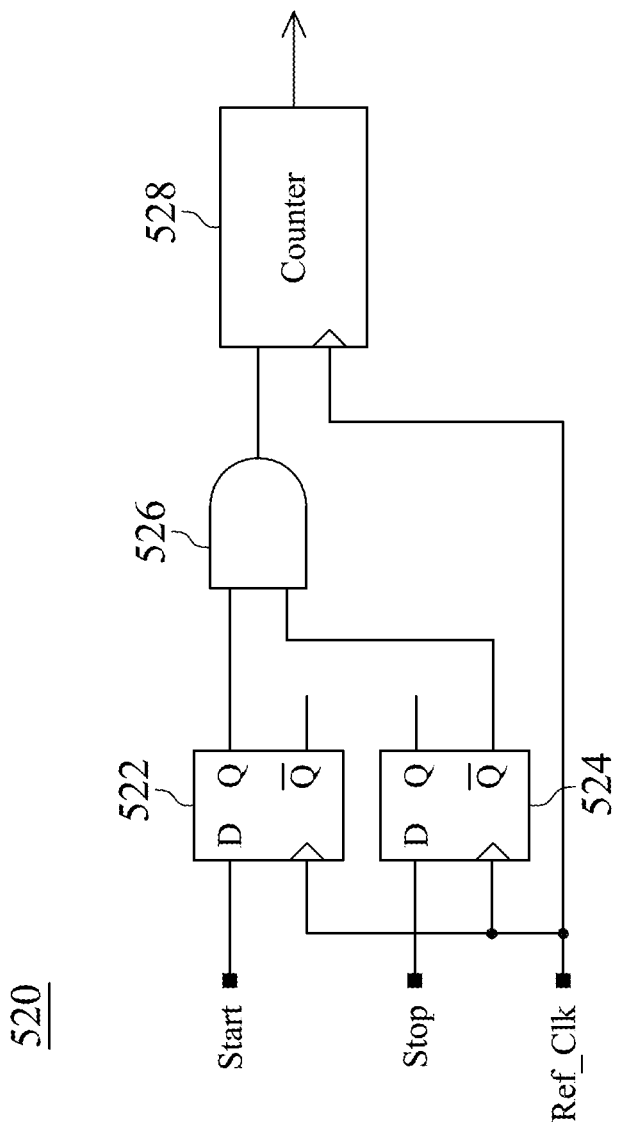
FIG. 5 shows a circuit diagram of a time-to-digital converter of the dynamic differential-reference time-to-digital converter for CIM applications of FIG. 4.

Please refer to FIGS. 4 and 5. FIG. 5 shows a circuit diagram of a time-to-digital converter 520 (each of TDC0, TDC1, TDC2 and TDC3) of the dynamic differential-reference time-to-digital converter 500 for CIM applications of FIG. 4. The time-to-digital converter 520 includes a first flip-flop 522, a second flip-flop 524, an AND gate 526 and a counter 528. The first flip-flop 522 is connected to a start signal Start and a reference clock Ref_Clk. The second flip-flop 524 is connected to a stop signal Stop and the reference clock Ref_Clk. Each of the first flip-flop 522 and the second flip-flop 524 includes an input port D and two output ports Q, $\overline{Q}$. The AND gate 526 is connected to the first flip-flop 522 and the second flip-flop 524. The counter 528 is connected to the AND gate 526 and the reference clock Ref_Clk. The first flip-flop 522 is configured to receive one of the bias reference BR and the edge selected signals ESEL1, ESEL2, ESEL3, i.e., the start signal Start is corresponding to the one of the bias reference BR and the edge selected signals ESEL1, ESEL2, ESEL3. The second flip-flop 524 is configured to receive the main reference MREF, i.e., the stop signal Stop is corresponding to the main reference MREF. The counter 528 is configured to generate one of the bias multiplication-and-accumulation value bMACV and the differential multiplication-and-accumulation values dMACV1, dMACV2, dMACV3.

In FIG. 4, the dynamic differential-reference time-to-digital converter 500 further includes a bias reference selector 530 (BR-SEL) and a multiplication-and-accumulation value recover 540 (MACV Recover). The bias reference selector 530 is configured to receive a bias control signal BIAS_CTRL and generate a bias value BIAS and a bias selecting signal BIAS_SEL according to the bias control signal BIAS_CTRL. The bias selecting signal BIAS_SEL is transmitted from the bias reference selector 530 to the EDC-replica reference row RREF. The bias reference BR is generated by the EDC-replica reference row RREF according to the bias selecting signal BIAS_SEL and corresponding to the bias value BIAS. In addition, the multiplication-and-accumulation value recover 540 is connected to the time-to-digital converter 520, the bias reference selector 530 and a shifter-adder circuit 502. The multiplication-and-accumulation value recover 540 is configured to receive the bias value BIAS, the bias multiplication-and-accumulation value bMACV and the differential multiplication-and-accumulation values dMACV1, dMACV2, dMACV3, and generate the partial multiplication-and-accumulation values pMACV of the 64 accumulations of 2bIN×1bW according to the bias value BIAS, the bias multiplication-and-accumulation value bMACV and the differential multiplication-and-accumulation values dMACV1, dMACV2, dMACV3 (e.g., pMACV=dMACV+bMACV+BIAS, where dMACV is equal to one of dMACV1, dMACV2 and dMACV3). The shifter-adder circuit 502 is represented by "Shifter & Adder" and configured to receive the partial multiplication-and-accumulation values pMACV from the multiplication-and-accumulation value recover 540. The shifter-adder circuit 502 is configured to shift and add the partial multiplication-and-accumulation values pMACV to generate a multi-bit CIM output signal. In other words, the shifter-adder circuit 502 combines 8 sets of 4 TDCouts (i.e., bMACV, dMACV1, dMACV2 and dMACV3 of the memory units 200 of one of the multi-bit weight delay computing blocks MWDCB0-MWDCB7) with their corresponding place-values to enable 8bIN×8bW×x64-channel operations with a near full-precision 22b MACV output.

Figure 6:
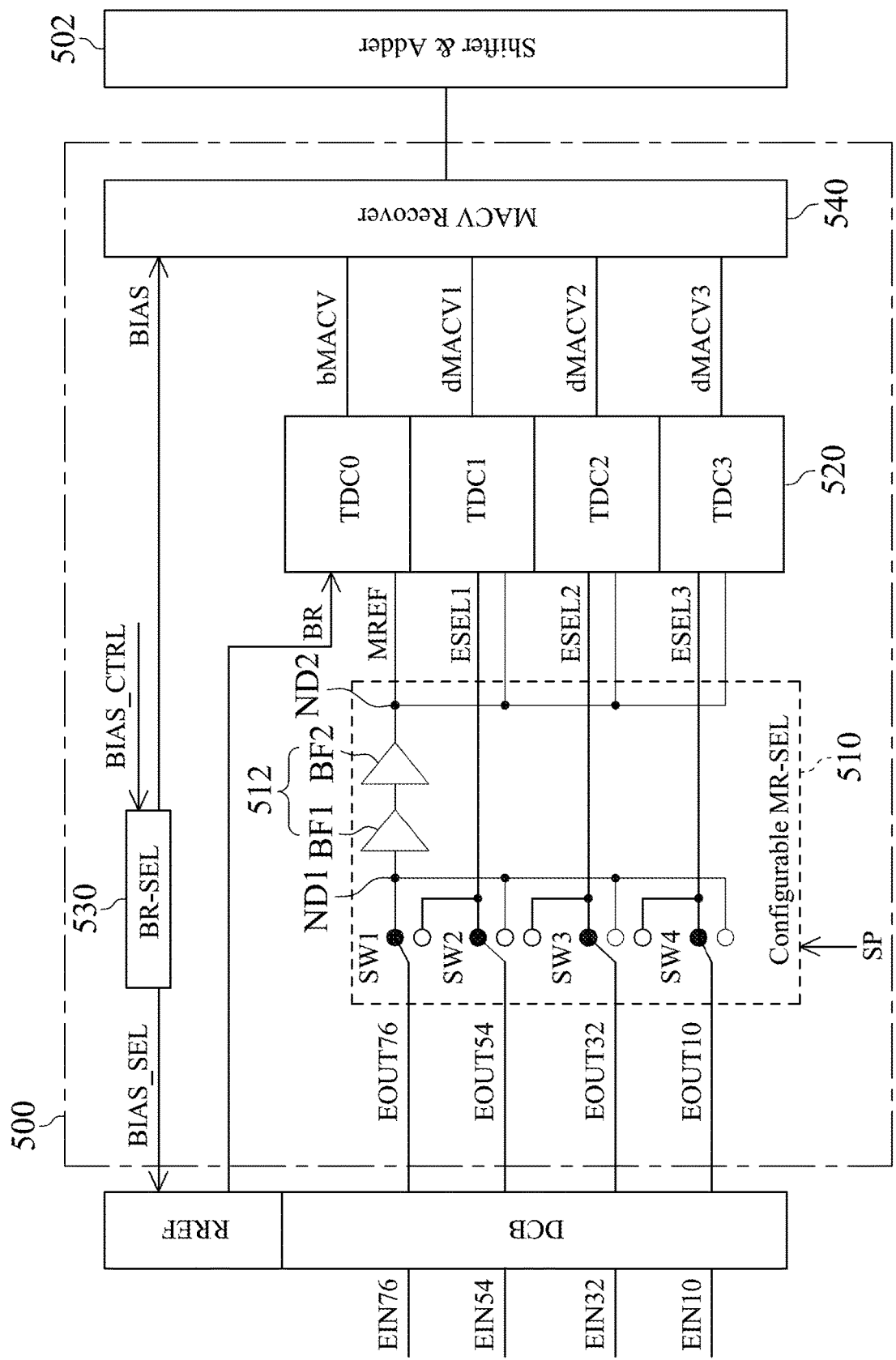
FIG. 6 shows a circuit diagram of the dynamic differential-reference time-to-digital converter for CIM applications of FIG. 4, when a first edge-output signal is corresponding to a main reference.

Please refer to FIGS. 4 and 6. FIG. 6 shows a circuit diagram of the dynamic differential-reference time-to-digital converter 500 for CIM applications of FIG. 4, when a first edge-output signal EOUT76 is corresponding to the main reference MREF. In response to determining that the first edge-output signal EOUT76 is electrically connected to the first node ND1 via the first switch SW1, the first edge-output signal EOUT76 is corresponding to the main reference MREF, and the second edge-output signal EOUT54 is transmitted to the first time-to-digital converter TDC1 via the second switch SW2. The third edge-output signal EOUT32 is transmitted to the second time-to-digital converter TDC2 via the third switch SW3, and the fourth edge-output signal EOUT10 is transmitted to the third time-to-digital converter TDC3 via the fourth switch SW4.

Figure 7:
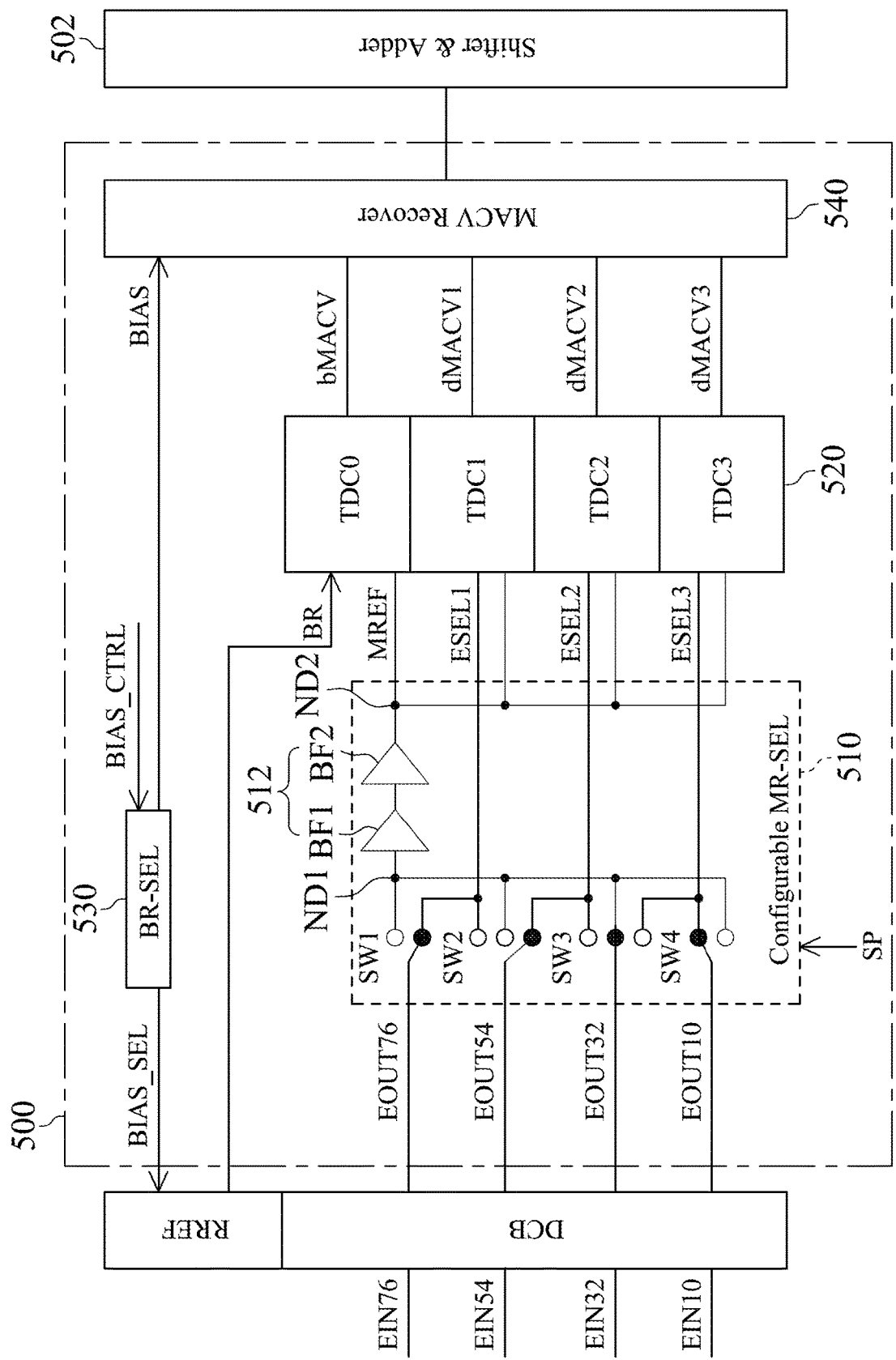
FIG. 7 shows a circuit diagram of the dynamic differential-reference time-to-digital converter for CIM applications of FIG. 4, when a third edge-output signal is corresponding to the main reference.

Please refer to FIGS. 4 and 7. FIG. 7 shows a circuit diagram of the dynamic differential-reference time-to-digital converter 500 for CIM applications of FIG. 4, when a third edge-output signal EOUT32 is corresponding to the main reference MREF. In response to determining that the third edge-output signal EOUT32 is electrically connected to the first node ND1 via the third switch SW3, the third edge-output signal EOUT32 is corresponding to the main reference MREF, and the first edge-output signal EOUT76 is transmitted to the first time-to-digital converter TDC1 via the first switch SW1. The second edge-output signal EOUT54 is transmitted to the second time-to-digital converter TDC2 via the second switch SW2, and the fourth edge-output signal EOUT10 is transmitted to the third time-to-digital converter TDC3 via the fourth switch SW4.

Figure 8:
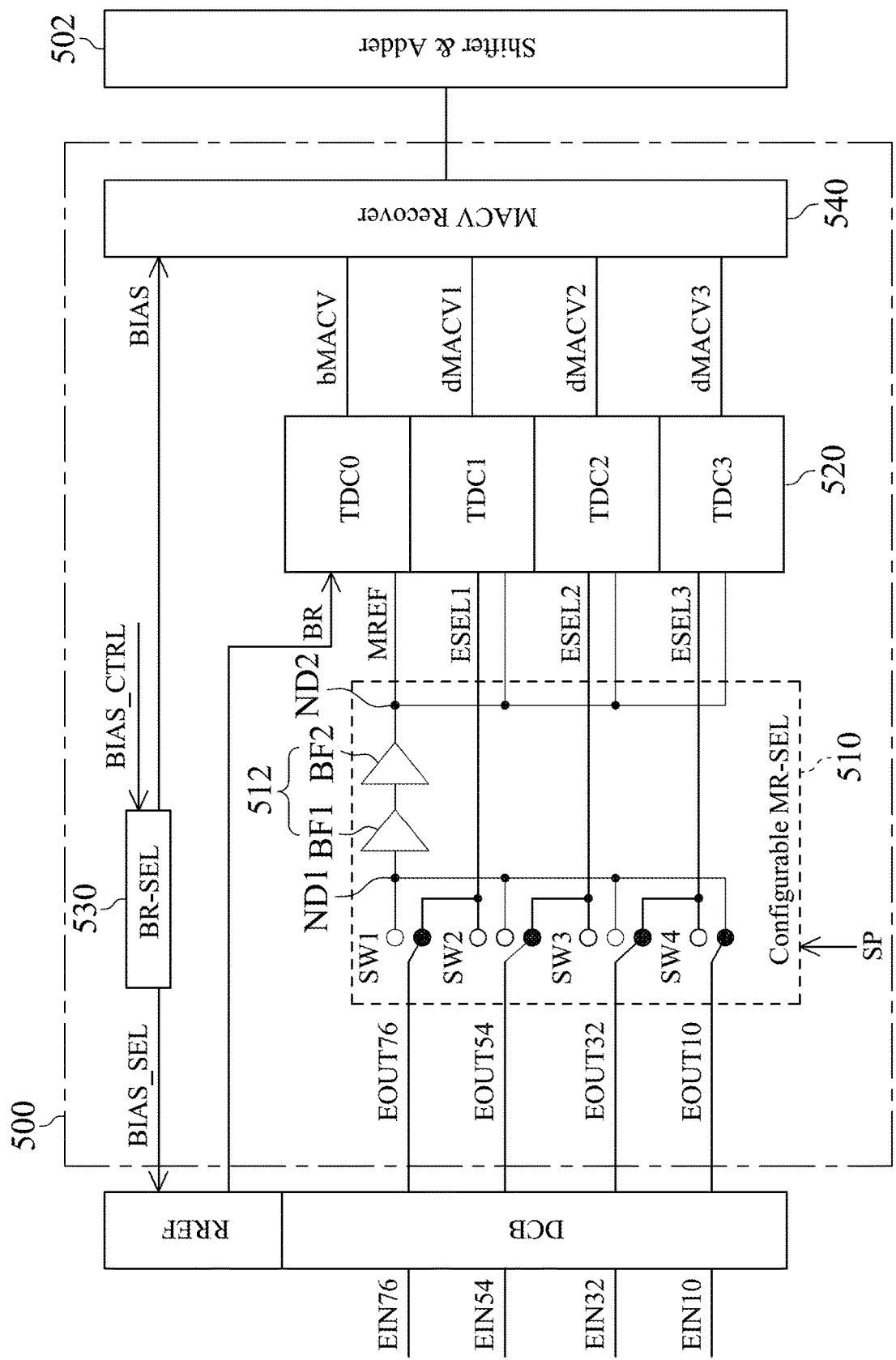
FIG. 8 shows a circuit diagram of the dynamic differential-reference time-to-digital converter for CIM applications of FIG. 4, when a fourth edge-output signal is corresponding to the main reference.

Please refer to FIGS. 4 and 8. FIG. 8 shows a circuit diagram of the dynamic differential-reference time-to-digital converter 500 for CIM applications of FIG. 4, when a fourth edge-output signal EOUT10 is corresponding to the main reference MREF. In response to determining that the fourth edge-output signal EOUT10 is electrically connected to the first node ND1 via the fourth switch SW4, the fourth edge-output signal EOUT10 is corresponding to the main reference MREF, and the first edge-output signal EOUT76 is transmitted to the first time-to-digital converter TDC1 via the first switch SW1. The second edge-output signal EOUT54 is transmitted to the second time-to-digital converter TDC2 via the second switch SW2, and the third edge-output signal EOUT32 is transmitted to the third time-to-digital converter TDC3 via the third switch SW3.

Figure 11:
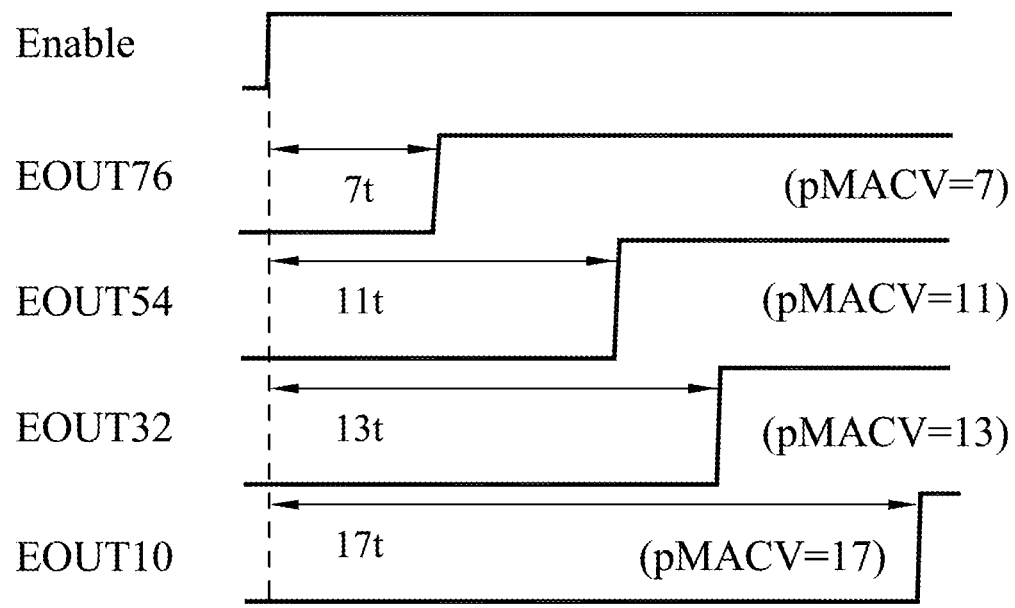
FIG. 11 shows a timing diagram associated with an enable reference, a plurality of edge-output signals and a plurality of partial multiplication-and-accumulation values of a conventional time-to-digital converter module, without the dynamic differential-reference time-to-digital converter.
Figure 12:
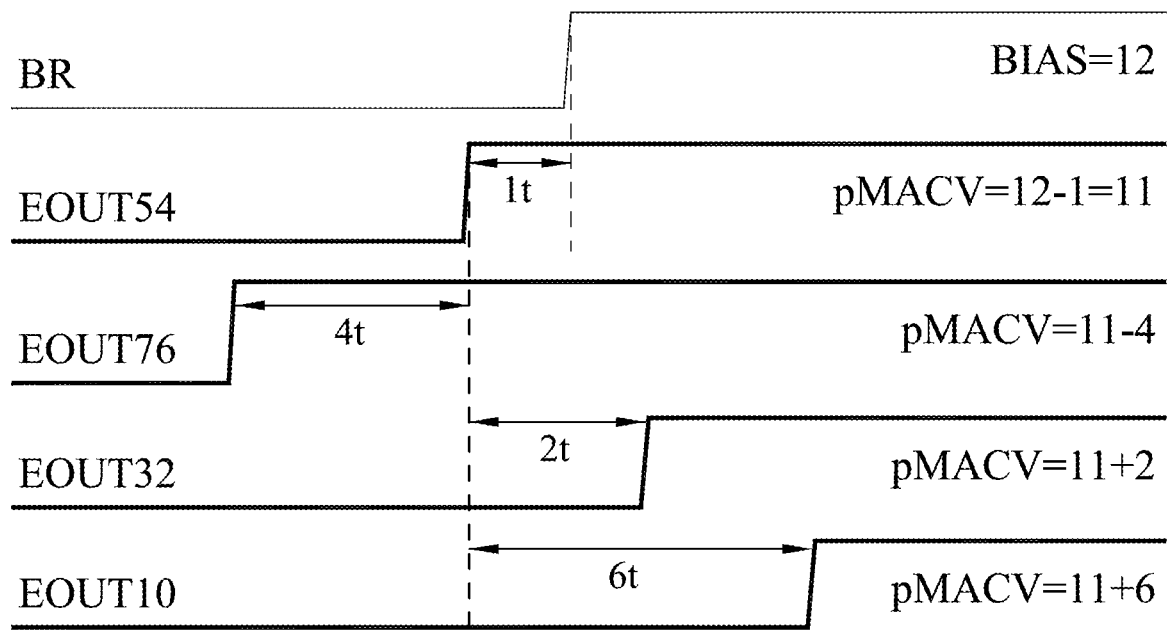
FIG. 12 shows a timing diagram associated with a bias reference, the edge-output signals and the partial multiplication-and-accumulation values of FIG. 4, with the dynamic differential-reference time-to-digital converter.

Please refer to FIGS. 4, 11 and 12. FIG. 11 shows a timing diagram associated with an enable reference Enable, a plurality of edge-output signals EOUT10, EOUT32, EOUT54, EOUT76 and a plurality of partial multiplication-and-accumulation values pMACV of a conventional time-to-digital converter module, without the dynamic differential-reference time-to-digital converter 500 (Without D2REF TDC). FIG. 12 shows a timing diagram associated with a bias reference BR, the edge-output signals EOUT10, EOUT32, EOUT54, EOUT76 and the partial multiplication-and-accumulation values pMACV of FIG. 4, with the dynamic differential-reference time-to-digital converter 500 (With D2REF TDC). In FIG. 11, the conventional time-to-digital converter module includes conventional time-to-digital converters configured to compare a plurality of time differences of rising edges between the enable reference Enable and the edge-output signals EOUT10, EOUT32, EOUT54, EOUT76 to output the partial multiplication-and-accumulation values pMACV (i.e., pMACV=7, 11, 13, 17).

A sum of the partial multiplication-and-accumulation values pMACV is corresponding to a sampling period of the conventional time-to-digital converters. The sum of the partial multiplication-and-accumulation values pMACV is equal to 48 (7+11+13+17), and the sampling period is equal to 48t (7t+11t+13t+17t), where t represents a unit time. In FIGS. 4 and 12, the one (TDC0) of the time-to-digital converters 520 (TDC0, TDC1, TDC2, TDC3) is configured to compare a time difference of rising edges between the bias reference BR and the main reference MREF to output the bias multiplication-and-accumulation value bMACV (i.e., bMACV=−1). The multiplication-and-accumulation value recover 540 is configured to generate the partial multiplication-and-accumulation value pMACV according to the bias value BIAS and the bias multiplication-and-accumulation value bMACV (i.e., pMACV=12−1=11). Moreover, the others (TDC1, TDC2, TDC3) of the time-to-digital converters 520 (TDC0, TDC1, TDC2, TDC3) are configured to compare a plurality of time differences of rising edges between the main reference MREF and the others (EOUT10, EOUT32, EOUT76) of the edge-output signals EOUT10, EOUT32, EOUT54, EOUT76 to output the differential multiplication-and-accumulation values dMACV1, dMACV2, dMACV3 (i.e., dMACV1=−4, dMACV2=2, dMACV3=6). The multiplication-and-accumulation value recover 540 is configured to generate the partial multiplication-and-accumulation values pMACV according to the bias value BIAS and the differential multiplication-and-accumulation values dMACV1, dMACV2, dMACV3 (i.e., pMACV=11−4, pMACV=11+2, pMACV=11+6). A sum of absolute values of the bias multiplication-and-accumulation value bMACV and the differential multiplication-and-accumulation values dMACV1, dMACV2, dMACV3 is corresponding to a sampling period of the time-to-digital converters 520 (TDC0, TDC1, TDC2, TDC3) and dynamically adjusted according to the bias reference BR and the predetermined setting parameter SP. The sum of the absolute values of the bias multiplication-and-accumulation value bMACV and the differential multiplication-and-accumulation values dMACV1, dMACV2, dMACV3 is equal to 13 (1+4+2+6), and the sampling period is equal to 13t (1t+4t+2t+6t).

In FIGS. 4, 11 and 12, it is obvious that when reading the third edge-output signal EOUT32, the conventional time-to-digital converter module requires a 13t sampling period, and the dynamic differential-reference time-to-digital converter 500 of the present disclosure requires only a 2t sampling period when the bias value BIAS=12 and the second edge-output signal EOUT54 has pMACV=11. Therefore, using a shorter period can reduce the number of sampling operations of the dynamic differential-reference time-to-digital converter 500 with power consumption to below that of the conventional time-to-digital converter module. Note that the main reference MREF, the bias reference BR and the predetermined setting parameter SP can be configured in accordance with the results of software analysis performed in the training stage. The main reference MREF, the bias reference BR and the predetermined setting parameter SP are uploaded to the memory array structure 100 (SRAM-based computing-in-memory, SRAM-CIM) when storing weight data for a chosen application and a neural network model. Table 2 lists the main reference MREF, an absolute bias reference (Abs. BIAS) and the bias reference BR of the dynamic differential-reference time-to-digital converter 500 of FIG. 4 with configuration for different network models and datasets. Table 3 lists average differential multiplication-and-accumulation values between X and Y (AVG[D(X,Y)]) with probability of 16 convolution layer MACV based on ResNet18 and Cifar100. Each of X and Y is one of the edge-output signals EOUT10, EOUT32, EOUT54, EOUT76. In one embodiment, the bias reference BR generated by the EDC-replica reference row RREF is equal to one of 4, 8, 12 and 16, but the present disclosure is not limited thereto. In other embodiment, the bias reference BR generated by the EDC-replica reference row RREF can be equal to the absolute bias reference (Abs. BIAS). For example, when the network model and the dataset are ResNet18 and Cifar100, respectively, a sum (SUM) of the average differential multiplication-and-accumulation values (AVG[D(EOUT54,Y)]) between the second edge-output signal EOUT54 and other edge-output signals (EOUT76, EOUT32, EOUT10) is the smallest, so that the second edge-output signal EOUT54 is selected as the main reference MREF, as listed in Table 3. In addition, the sum (SUM) of the average differential multiplication-and-accumulation values (AVG[D(EOUT54,Y)]) between the second edge-output signal EOUT54 and the other edge-output signals (EOUT76, EOUT32, EOUT10) is closest to 12, so that the bias reference BR is set to be 12 for reducing the bias multiplication-and-accumulation value bMACV, as listed in Table 2.

TABLE 2

| Network | Dataset | MREF | Abs. BIAS | BR (4/8/12/16) |
|---|---|---|---|---|
| VGG11 | Cifar10 | EOUT54 | 8 | 8 |
|  | Cifar100 | EOUT54 | 11 | 12 |
| VGG16 | Cifar10 | EOUT54 | 8 | 8 |
|  | Cifar100 | EOUT54 | 13 | 12 |
| ResNet18 | Cifar10 | EOUT54 | 11 | 12 |
|  | Cifar100 | EOUT54 | 11 | 12 |
| ResNet20 | Cifar10 | EOUT54 | 17 | 16 |
|  | Cifar100 | EOUT54 | 19 | 16 |
| ResNet50 | Cifar10 | EOUT54 | 10 | 8 |
|  | Cifar100 | EOUT54 | 13 | 12 |

TABLE 3

| | X | | | |
|---|---|---|---|---|
| AVG[D(X, Y)] | EOUT76 | EOUT54 | EOUT32 | EOUT10 |
| AVG[D(X, EOUT76)] |  | 6.25 | 7.70 | 8.08 |
| AVG[D(X, EOUT54)] | 6.25 |  | 3.62 | 3.76 |
| AVG[D(X, EOUT32)] | 7.70 | 3.62 |  | 3.39 |
| AVG[D(X, EOUT10)] | 8.08 | 3.76 | 3.39 |  |
| SUM | 22.03 | 13.63 | 14.71 | 15.23 |

Figure 13:
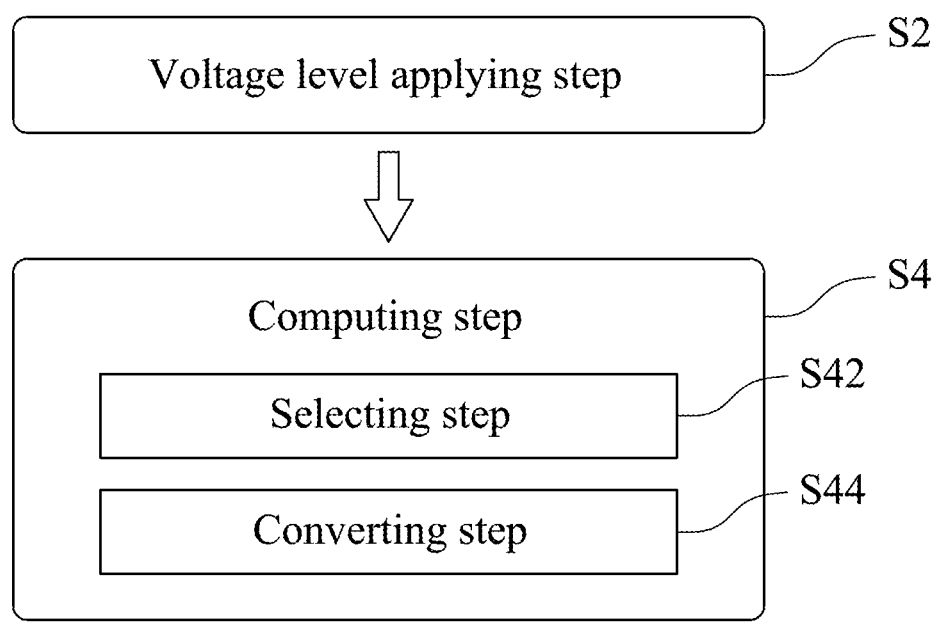
FIG. 13 shows a flow chart of a computing method of a dynamic differential-reference time-to-digital converter for CIM applications according to a second embodiment of the present disclosure.

Please refer to FIGS. 1, 4 and 13. FIG. 13 shows a flow chart of a computing method 600 of a dynamic differential-reference time-to-digital converter 500 for CIM applications according to a second embodiment of the present disclosure. The computing method 600 of the dynamic differential-reference time-to-digital converter 500 for CIM applications is controlled by a bias reference BR and a predetermined setting parameter SP. The computing method 600 includes performing a voltage level applying step S2 and a computing step S4.

The voltage level applying step S2 includes applying a plurality of voltage levels to the bias reference BR, the predetermined setting parameter SP and a plurality of edge-output signals EOUT10, EOUT32, EOUT54, EOUT76, respectively.

The computing step S4 includes performing a selecting step S42 and a converting step S44. The selecting step S42 includes configuring a configurable main-reference selector 510 (Configurable MR-SEL) to select one (EOUT54) of the edge-output signals EOUT10, EOUT32, EOUT54, EOUT76 as a main reference MREF and select others (EOUT10, EOUT32, EOUT76) of the edge-output signals EOUT10, EOUT32, EOUT54, EOUT76 as a plurality of edge selected signals ESEL1, ESEL2, ESEL3 according to the predetermined setting parameter SP. The converting step S44 includes configuring one (TDC0) of a plurality of time-to-digital converters 520 (TDC0, TDC1, TDC2, TDC3) to compare the bias reference BR with the main reference MREF to output a bias multiplication-and-accumulation value bMACV, and configuring others (TDC1, TDC2, TDC3) of the time-to-digital converters 520 to compare the main reference MREF with the edge selected signals ESEL1, ESEL2, ESEL3 to output a plurality of differential multiplication-and-accumulation values dMACV1, dMACV2, dMACV3. The bias multiplication-and-accumulation value bMACV and the differential multiplication-and-accumulation values dMACV1, dMACV2, dMACV3 are dynamically adjusted according to the bias reference BR and the predetermined setting parameter SP. Therefore, the computing method 600 of the dynamic differential-reference time-to-digital converter 500 for CIM applications of the present disclosure utilizes the dynamic differential-reference based readout scheme to adapt suitable reference signal (e.g., the bias reference BR and the main reference MREF) according to different implementations, thereby reducing the total power consumption, shortening the sampling periods and improving the overall circuit performance in readout operations.

In FIGS. 4 and 13, the selecting step S42 further includes configuring a buffer module 512 of the configurable main-reference selector 510 to electrically connect between a first node ND1 and a second node ND2. The first node ND1 is electrically connected to the one (EOUT54) of the edge-output signals EOUT10, EOUT32, EOUT54, EOUT76, and the second node ND2 is electrically connected to the time-to-digital converters 520 and corresponding to the main reference MREF. The edge-output signals EOUT10, EOUT32, EOUT54, EOUT76 include a first edge-output signal EOUT76, a second edge-output signal EOUT54, a third edge-output signal EOUT32 and a fourth edge-output signal EOUT10. The others of the time-to-digital converters 520 include a first time-to-digital converter TDC1, a second time-to-digital converter TDC2 and a third time-to-digital converter TDC3. The selecting step S42 further includes configuring a first switch SW1 of the configurable main-reference selector 510 to electrically connect to the first edge-output signal EOUT76 and one of the first node ND1 and the first time-to-digital converter TDC1 according to the predetermined setting parameter SP; configuring a second switch SW2 of the configurable main-reference selector 510 to electrically connect to the second edge-output signal EOUT54 and one of the first time-to-digital converter TDC1, the first node ND1 and the second time-to-digital converter TDC2 according to the predetermined setting parameter SP; configuring a third switch SW3 of the configurable main-reference selector 510 to electrically connect to the third edge-output signal EOUT32 and one of the second time-to-digital converter TDC2, the first node ND1 and the third time-to-digital converter TDC3 according to the predetermined setting parameter SP; and configuring a fourth switch SW4 of the configurable main-reference selector 510 to electrically connect to the fourth edge-output signal EOUT10 and one of the third time-to-digital converter TDC3 and the first node ND1 according to the predetermined setting parameter SP.

Figure 14:
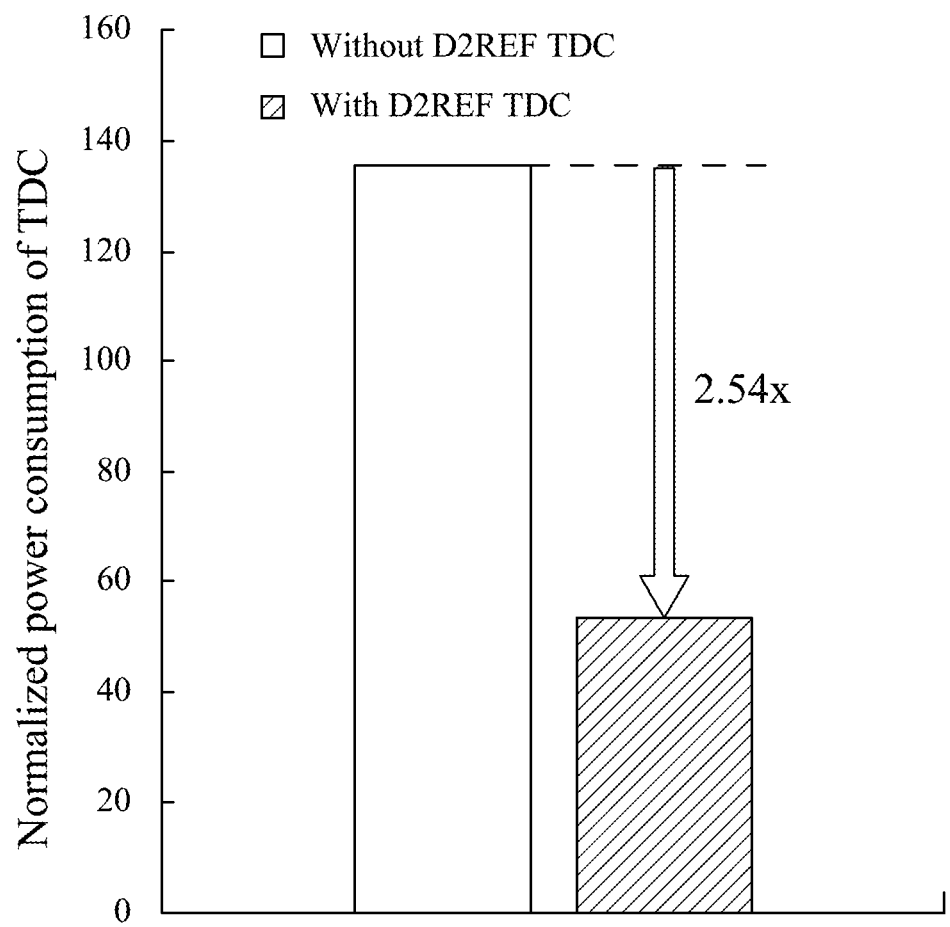
FIG. 14 shows a comparison result of normalized power consumption of the dynamic differential-reference time-to-digital converter of the present disclosure and the conventional time-to-digital converter module.

Please refer to FIGS. 4 and 11-14. FIG. 14 shows a comparison result of normalized power consumption of the dynamic differential-reference time-to-digital converter 500 (Normalized power consumption of TDC) of the present disclosure and the conventional time-to-digital converter module. By reducing the sampling period of a readout circuit, the dynamic differential-reference time-to-digital converter 500 for CIM applications and the computing method 600 thereof of the present disclosure can reduce the average readout power consumption by 2.54× compared to the conventional time-to-digital converter module and a conventional computing method thereof, when applying the network model ResNet18 to the dataset Cifar100.

According to the aforementioned embodiments and examples, the advantages of the present disclosure are described as follows.

1. The memory array structure with the dynamic differential-reference based readout scheme for CIM applications, the dynamic differential-reference time-to-digital converter for CIM applications and the computing method thereof of the present disclosure utilize the dynamic differential-reference based readout scheme to adapt suitable reference signal (e.g., the bias reference and the main reference) according to different implementations, thereby reducing the total power consumption, shortening the sampling periods and improving the overall circuit performance in readout operations.

2. Using a shorter period can reduce the number of sampling operations of the dynamic differential-reference time-to-digital converter with power consumption to below that of the conventional time-to-digital converter module.

3. By reducing the sampling period of the readout circuit, the dynamic differential-reference time-to-digital converter for CIM applications and the computing method thereof of the present disclosure can reduce the average readout power consumption by 2.54× compared to the conventional time-to-digital converter module and the conventional computing method thereof, when applying the network model ResNet18 to the dataset Cifar100.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A dynamic differential-reference time-to-digital converter for computing-in-memory applications, which is controlled by a bias reference and a predetermined setting parameter, the dynamic differential-reference time-to-digital converter for computing-in-memory applications comprising:

a configurable main-reference selector configured to receive a plurality of edge-output signals, wherein the configurable main-reference selector is configured to select one of the edge-output signals as a main reference and select others of the edge-output signals as a plurality of edge selected signals according to the predetermined setting parameter; and a plurality of time-to-digital converters connected to the configurable main-reference selector and configured to receive the bias reference, the main reference and the edge selected signals, wherein one of the time-to-digital converters is configured to compare the bias reference with the main reference to output a bias multiplication-and-accumulation value, and others of the time-to-digital converters are configured to compare the main reference with the edge selected signals to output a plurality of differential multiplication-and-accumulation values;

wherein the bias multiplication-and-accumulation value and the differential multiplication-and-accumulation values are dynamically adjusted according to the bias reference and the predetermined setting parameter.

2. The dynamic differential-reference time-to-digital converter for computing-in-memory applications of claim 1, further comprising:

a bias reference selector configured to receive a bias control signal and generate a bias value and a bias selecting signal according to the bias control signal;

wherein the bias reference is generated according to the bias selecting signal and corresponding to the bias value.

3. The dynamic differential-reference time-to-digital converter for computing-in-memory applications of claim 1, wherein the configurable main-reference selector comprises:

a first node electrically connected to the one of the edge-output signals;

a second node electrically connected to the time-to-digital converters and corresponding to the main reference; and a buffer module electrically connected between the first node and the second node.

4. The dynamic differential-reference time-to-digital converter for computing-in-memory applications of claim 3, wherein, the edge-output signals comprise a first edge-output signal, a second edge-output signal, a third edge-output signal and a fourth edge-output signal;

the others of the time-to-digital converters comprise a first time-to-digital converter, a second time-to-digital converter and a third time-to-digital converter; and the configurable main-reference selector further comprises:

a first switch electrically connected to the first edge-output signal and one of the first node and the first time-to-digital converter according to the predetermined setting parameter;

a second switch electrically connected to the second edge-output signal and one of the first time-to-digital converter, the first node and the second time-to-digital converter according to the predetermined setting parameter;

a third switch electrically connected to the third edge-output signal and one of the second time-to-digital converter, the first node and the third time-to-digital converter according to the predetermined setting parameter; and a fourth switch electrically connected to the fourth edge-output signal and one of the third time-to-digital converter and the first node according to the predetermined setting parameter.

5. The dynamic differential-reference time-to-digital converter for computing-in-memory applications of claim 4, wherein, in response to determining that the first edge-output signal is electrically connected to the first node via the first switch, the first edge-output signal is corresponding to the main reference, the second edge-output signal is transmitted to the first time-to-digital converter via the second switch, the third edge-output signal is transmitted to the second time-to-digital converter via the third switch, and the fourth edge-output signal is transmitted to the third time-to-digital converter via the fourth switch;

in response to determining that the second edge-output signal is electrically connected to the first node via the second switch, the second edge-output signal is corresponding to the main reference, the first edge-output signal is transmitted to the first time-to-digital converter via the first switch, the third edge-output signal is transmitted to the second time-to-digital converter via the third switch, and the fourth edge-output signal is transmitted to the third time-to-digital converter via the fourth switch;

in response to determining that the third edge-output signal is electrically connected to the first node via the third switch, the third edge-output signal is corresponding to the main reference, the first edge-output signal is transmitted to the first time-to-digital converter via the first switch, the second edge-output signal is transmitted to the second time-to-digital converter via the second switch, and the fourth edge-output signal is transmitted to the third time-to-digital converter via the fourth switch; and in response to determining that the fourth edge-output signal is electrically connected to the first node via the fourth switch, the fourth edge-output signal is corresponding to the main reference, the first edge-output signal is transmitted to the first time-to-digital converter via the first switch, the second edge-output signal is transmitted to the second time-to-digital converter via the second switch, and the third edge-output signal is transmitted to the third time-to-digital converter via the third switch.

6. The dynamic differential-reference time-to-digital converter for computing-in-memory applications of claim 1, wherein each of the time-to-digital converters comprises:

a first flip-flop connected to a reference clock;

a second flip-flop connected to the reference clock;

an AND gate connected to the first flip-flop and the second flip-flop; and a counter connected to the AND gate and the reference clock;

wherein the first flip-flop is configured to receive one of the bias reference and the edge selected signals, the second flip-flop is configured to receive the main reference, and the counter is configured to generate one of the bias multiplication-and-accumulation value and the differential multiplication-and-accumulation values.

7. The dynamic differential-reference time-to-digital converter for computing-in-memory applications of claim 1, wherein, the one of the time-to-digital converters is configured to compare a time difference of rising edges between the bias reference and the main reference to output the bias multiplication-and-accumulation value; and the others of the time-to-digital converters are configured to compare a plurality of time differences of rising edges between the main reference and the others of the edge-output signals to output the differential multiplication-and-accumulation values.

8. The dynamic differential-reference time-to-digital converter for computing-in-memory applications of claim 1, wherein a sum of absolute values of the bias multiplication-and-accumulation value and the differential multiplication-and-accumulation values is corresponding to a sampling period of the time-to-digital converters and dynamically adjusted according to the bias reference and the predetermined setting parameter.

9. A memory array structure with a dynamic differential-reference based readout scheme for computing-in-memory applications, which is controlled by a bias reference and a predetermined setting parameter, the memory array structure with the dynamic differential-reference based readout scheme for computing-in-memory applications comprising:
a delay computing block configured to receive a plurality of multi-bit analog input voltages, a plurality of edge-input signals and a weight, wherein the delay computing block is configured to generate a plurality of edge-output signals having a plurality of delay times according to the multi-bit analog input voltages, the edge-input signals and the weight; and
a dynamic differential-reference time-to-digital converter connected to the delay computing block and comprising:
a configurable main-reference selector configured to receive the edge-output signals, wherein the configurable main-reference selector is configured to select one of the edge-output signals as a main reference and select others of the edge-output signals as a plurality of edge selected signals according to the predetermined setting parameter; and
a plurality of time-to-digital converters connected to the configurable main-reference selector and configured to receive the bias reference, the main reference and the edge selected signals, wherein one of the time-to-digital converters is configured to compare the bias reference with the main reference to output a bias multiplication-and-accumulation value, and others of the time-to-digital converters are configured to compare the main reference with the edge selected signals to output a plurality of differential multiplication-and-accumulation values;
wherein the bias multiplication-and-accumulation value and the differential multiplication-and-accumulation values are dynamically adjusted according to the bias reference and the predetermined setting parameter.

10. The memory array structure with the dynamic differential-reference based readout scheme for computing-in-memory applications of claim 9, wherein the dynamic differential-reference time-to-digital converter further comprises:
a bias reference selector configured to receive a bias control signal and generate a bias value and a bias selecting signal according to the bias control signal;
wherein the bias reference is generated according to the bias selecting signal and corresponding to the bias value.

11. The memory array structure with the dynamic differential-reference based readout scheme for computing-in-memory applications of claim 9, wherein the configurable main-reference selector comprises:
a first node electrically connected to the one of the edge-output signals;
a second node electrically connected to the time-to-digital converters and corresponding to the main reference; and
a buffer module electrically connected between the first node and the second node.

12. The memory array structure with the dynamic differential-reference based readout scheme for computing-in-memory applications of claim 11, wherein,
the edge-output signals comprise a first edge-output signal, a second edge-output signal, a third edge-output signal and a fourth edge-output signal;
the others of the time-to-digital converters comprise a first time-to-digital converter, a second time-to-digital converter and a third time-to-digital converter; and
the configurable main-reference selector further comprises:
a first switch electrically connected to the first edge-output signal and one of the first node and the first time-to-digital converter according to the predetermined setting parameter;
a second switch electrically connected to the second edge-output signal and one of the first time-to-digital converter, the first node and the second time-to-digital converter according to the predetermined setting parameter;
a third switch electrically connected to the third edge-output signal and one of the second time-to-digital converter, the first node and the third time-to-digital converter according to the predetermined setting parameter; and
a fourth switch electrically connected to the fourth edge-output signal and one of the third time-to-digital converter and the first node according to the predetermined setting parameter.

13. The memory array structure with the dynamic differential-reference based readout scheme for computing-in-memory applications of claim 12, wherein,
in response to determining that the first edge-output signal is electrically connected to the first node via the first switch, the first edge-output signal is corresponding to the main reference, the second edge-output signal is transmitted to the first time-to-digital converter via the second switch, the third edge-output signal is transmitted to the second time-to-digital converter via the third switch, and the fourth edge-output signal is transmitted to the third time-to-digital converter via the fourth switch;
in response to determining that the second edge-output signal is electrically connected to the first node via the second switch, the second edge-output signal is corresponding to the main reference, the first edge-output signal is transmitted to the first time-to-digital converter via the first switch, the third edge-output signal is transmitted to the second time-to-digital converter via the third switch, and the fourth edge-output signal is transmitted to the third time-to-digital converter via the fourth switch;
in response to determining that the third edge-output signal is electrically connected to the first node via the third switch, the third edge-output signal is corresponding to the main reference, the first edge-output signal is transmitted to the first time-to-digital converter via the first switch, the second edge-output signal is transmitted to the second time-to-digital converter via the second switch, and the fourth edge-output signal is transmitted to the third time-to-digital converter via the fourth switch; and in response to determining that the fourth edge-output signal is electrically connected to the first node via the fourth switch, the fourth edge-output signal is corresponding to the main reference, the first edge-output signal is transmitted to the first time-to-digital converter via the first switch, the second edge-output signal is transmitted to the second time-to-digital converter via the second switch, and the third edge-output signal is transmitted to the third time-to-digital converter via the third switch.

14. The memory array structure with the dynamic differential-reference based readout scheme for computing-in-memory applications of claim 9, wherein each of the time-to-digital converters comprises:
a first flip-flop connected to a reference clock;
a second flip-flop connected to the reference clock;
an AND gate connected to the first flip-flop and the second flip-flop; and
a counter connected to the AND gate and the reference clock;
wherein the first flip-flop is configured to receive one of the bias reference and the edge selected signals, the second flip-flop is configured to receive the main reference, and the counter is configured to generate one of the bias multiplication-and-accumulation value and the differential multiplication-and-accumulation values.

15. The memory array structure with the dynamic differential-reference based readout scheme for computing-in-memory applications of claim 9, wherein,
the one of the time-to-digital converters is configured to compare a time difference of rising edges between the bias reference and the main reference to output the bias multiplication-and-accumulation value; and
the others of the time-to-digital converters are configured to compare a plurality of time differences of rising edges between the main reference and the others of the edge-output signals to output the differential multiplication-and-accumulation values.

16. The memory array structure with the dynamic differential-reference based readout scheme for computing-in-memory applications of claim 9, wherein a sum of absolute values of the bias multiplication-and-accumulation value and the differential multiplication-and-accumulation values is corresponding to a sampling period of the time-to-digital converters and dynamically adjusted according to the bias reference and the predetermined setting parameter.

17. A computing method of a dynamic differential-reference time-to-digital converter for computing-in-memory applications, which is controlled by a bias reference and a predetermined setting parameter, the computing method comprising:
performing a voltage level applying step, wherein the voltage level applying step comprises applying a plurality of voltage levels to the bias reference, the predetermined setting parameter and a plurality of edge-output signals, respectively; and
performing a computing step, wherein the computing step comprises:
performing a selecting step, wherein the selecting step comprises configuring a configurable main-reference selector to select one of the edge-output signals as a main reference and select others of the edge-output signals as a plurality of edge selected signals according to the predetermined setting parameter; and
performing a converting step, wherein the converting step comprises configuring one of a plurality of time-to-digital converters to compare the bias reference with the main reference to output a bias multiplication-and-accumulation value, and configuring others of the time-to-digital converters to compare the main reference with the edge selected signals to output a plurality of differential multiplication-and-accumulation values;
wherein the bias multiplication-and-accumulation value and the differential multiplication-and-accumulation values are dynamically adjusted according to the bias reference and the predetermined setting parameter.

18. The computing method of claim 17, wherein the selecting step further comprises:
configuring a buffer module of the configurable main-reference selector to electrically connect between a first node and a second node, wherein the first node is electrically connected to the one of the edge-output signals, and the second node is electrically connected to the time-to-digital converters and corresponding to the main reference.

19. The computing method of claim 18, wherein,
the edge-output signals comprise a first edge-output signal, a second edge-output signal, a third edge-output signal and a fourth edge-output signal;
the others of the time-to-digital converters comprise a first time-to-digital converter, a second time-to-digital converter and a third time-to-digital converter; and
the selecting step further comprises:
configuring a first switch of the configurable main-reference selector to electrically connect to the first edge-output signal and one of the first node and the first time-to-digital converter according to the predetermined setting parameter;
configuring a second switch of the configurable main-reference selector to electrically connect to the second edge-output signal and one of the first time-to-digital converter, the first node and the second time-to-digital converter according to the predetermined setting parameter;
configuring a third switch of the configurable main-reference selector to electrically connect to the third edge-output signal and one of the second time-to-digital converter, the first node and the third time-to-digital converter according to the predetermined setting parameter; and
configuring a fourth switch of the configurable main-reference selector to electrically connect to the fourth edge-output signal and one of the third time-to-digital converter and the first node according to the predetermined setting parameter.

20. The computing method of claim 19, wherein,
in response to determining that the first edge-output signal is electrically connected to the first node via the first switch, the first edge-output signal is corresponding to the main reference, the second edge-output signal is transmitted to the first time-to-digital converter via the second switch, the third edge-output signal is transmitted to the second time-to-digital converter via the third switch, and the fourth edge-output signal is transmitted to the third time-to-digital converter via the fourth switch;
in response to determining that the second edge-output signal is electrically connected to the first node via the second switch, the second edge-output signal is corresponding to the main reference, the first edge-output signal is transmitted to the first time-to-digital converter via the first switch, the third edge-output signal is transmitted to the second time-to-digital converter via the third switch, and the fourth edge-output signal is transmitted to the third time-to-digital converter via the fourth switch;

in response to determining that the third edge-output signal is electrically connected to the first node via the third switch, the third edge-output signal is corresponding to the main reference, the first edge-output signal is transmitted to the first time-to-digital converter via the first switch, the second edge-output signal is transmitted to the second time-to-digital converter via the second switch, and the fourth edge-output signal is transmitted to the third time-to-digital converter via the fourth switch; and in response to determining that the fourth edge-output signal is electrically connected to the first node via the fourth switch, the fourth edge-output signal is corresponding to the main reference, the first edge-output signal is transmitted to the first time-to-digital converter via the first switch, the second edge-output signal is transmitted to the second time-to-digital converter via the second switch, and the third edge-output signal is transmitted to the third time-to-digital converter via the third switch.

* * * * *